(12) United States Patent
Frampton et al.

(10) Patent No.: US 10,063,097 B2
(45) Date of Patent: Aug. 28, 2018

(54) SEGMENTED WAVEFORM CONVERTER ON CONTROLLED FIELD VARIABLE SPEED GENERATOR

(71) Applicant: Kohler Co., Kohler, WI (US)

(72) Inventors: Isaac S. Frampton, Strattanville, PA (US); Adam Larson, Mequon, WI (US); Terrence Rotter, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 26 days.

(21) Appl. No.: 15/175,761

(22) Filed: Jun. 7, 2016

(65) Prior Publication Data

US 2017/0110976 A1 Apr. 20, 2017

Related U.S. Application Data

(63) Continuation-in-part of application No. 14/885,112, filed on Oct. 16, 2015.

(51) Int. Cl.
*H02J 7/00* (2006.01)
*H02J 50/10* (2016.01)
(Continued)

(52) U.S. Cl.
CPC ............ *H02J 50/10* (2016.02); *H02J 7/1492* (2013.01); *H02M 5/297* (2013.01); *H02P 9/30* (2013.01);
(Continued)

(58) Field of Classification Search
CPC .. H02P 9/30; H02P 9/08; H02P 27/16; H02M 7/00; H02M 5/00; H02M 5/02;
(Continued)

(56) References Cited

U.S. PATENT DOCUMENTS

| 3,641,418 A | 2/1972 | Plette |
| 3,659,168 A | 4/1972 | Salihi et al. |

(Continued)

FOREIGN PATENT DOCUMENTS

| GB | 2160027 A | 12/1985 |
| JP | H11332001 A | 11/1999 |

(Continued)

OTHER PUBLICATIONS

Hustler "Zeon Parts Manual, Zeon model 929141 & 929141EX" https://www.hustlerturf.com/file/112480_1111.pdf, pp. 1-78.

(Continued)

*Primary Examiner* — Julio C. Gonzalez Ramirez
(74) *Attorney, Agent, or Firm* — Lempia Summerfield Katz LLC

(57) ABSTRACT

An apparatus includes a controlled field alternator or utility source of electrical power, a segmented waveform converter, and a controller. The source of electrical power is configured to generate a polyphase signal. The synchronous inverter includes multiple switches connected between the polyphase signal of the source of electrical power and an output filter. The controller is configured to provide a control signal for the switches based on measured electrical quantities associated with the output filter and may provide a field control signal to the controlled field alternator. The apparatus may be applied to a vehicle, a lawnmower, a zero turn radius lawnmower, or another type of machine.

16 Claims, 31 Drawing Sheets

(51) Int. Cl.
*H02J 7/14* (2006.01)
*H02P 9/30* (2006.01)
*H02M 5/297* (2006.01)
*H02P 9/48* (2006.01)
*H02M 1/12* (2006.01)
*H02M 3/158* (2006.01)
*H02M 7/219* (2006.01)
*H02M 1/00* (2006.01)

(52) U.S. Cl.
CPC .............. *H02P 9/48* (2013.01); *H02M 1/126* (2013.01); *H02M 3/158* (2013.01); *H02M 7/219* (2013.01); *H02M 2001/007* (2013.01); *H02M 2001/008* (2013.01); *H02M 2001/0077* (2013.01)

(58) Field of Classification Search
CPC ................. H02M 5/293; H20M 11/00; H20M 2001/0077; H02J 7/1492
USPC .... 322/59, 44, 28, 89, 7; 180/65.26, 65.512; 290/40 C, 40 R; 56/14.8, 14.7, 10.1
See application file for complete search history.

(56) References Cited

U.S. PATENT DOCUMENTS

| | | | |
|---|---|---|---|
| 3,937,974 A | 2/1976 | Lafuze | |
| 3,989,996 A | 11/1976 | Stacey | |
| 4,152,882 A | 5/1979 | Howard | |
| 4,318,266 A | 3/1982 | Taube | |
| 4,443,997 A | 4/1984 | Namdari | |
| 4,539,483 A | 9/1985 | Freeny, Jr. | |
| 4,559,768 A | 12/1985 | Dunn | |
| 4,841,202 A | 6/1989 | Dishner et al. | |
| 4,870,811 A | 10/1989 | Steele | |
| 4,964,265 A | 10/1990 | Young | |
| 5,007,234 A | 4/1991 | Shurman et al. | |
| 5,204,814 A | 4/1993 | Noonan et al. | |
| 5,323,593 A | 6/1994 | Cline et al. | |
| 5,329,439 A | 7/1994 | Borojevic et al. | |
| 5,433,066 A | 7/1995 | Wenzel et al. | |
| 5,442,901 A | 8/1995 | Niemela et al. | |
| 5,563,774 A | 10/1996 | Welsch | |
| 5,794,422 A | 8/1998 | Reimers et al. | |
| 5,848,659 A * | 12/1998 | Karg | B60L 11/02 180/65.245 |
| 5,909,367 A | 6/1999 | Change | |
| 6,082,084 A | 7/2000 | Reimers et al. | |
| 6,269,617 B1 | 8/2001 | Blanchard | |
| 6,359,344 B1 | 3/2002 | Klein et al. | |
| 6,449,934 B1 | 9/2002 | Reimers et al. | |
| 6,487,838 B2 | 12/2002 | Handlin | |
| 6,571,542 B1 | 6/2003 | Fillman et al. | |
| 6,591,593 B1 | 7/2003 | Brandon et al. | |
| 6,603,227 B2 | 8/2003 | Rose, Sr. | |
| 6,604,348 B2 | 8/2003 | Hunt | |
| 6,622,804 B2 | 9/2003 | Schmitz et al. | |
| 6,644,004 B2 | 11/2003 | Reimers et al. | |
| 6,729,114 B2 | 5/2004 | Fillman et al. | |
| 6,739,116 B2 | 5/2004 | Stover et al. | |
| 6,892,518 B1 | 5/2005 | Bares | |
| 6,938,400 B2 | 9/2005 | Fillman et al. | |
| 6,948,299 B2 | 9/2005 | Osborne | |
| 6,987,328 B2 | 1/2006 | Osborne | |
| 7,003,936 B1 | 2/2006 | Yue et al. | |
| 7,017,327 B2 | 3/2006 | Hunt et al. | |
| 7,117,964 B1 | 10/2006 | Kuang et al. | |
| 7,318,493 B2 | 1/2008 | Medina | |
| 7,392,869 B2 | 7/2008 | Carlson et al. | |
| 7,493,697 B2 | 2/2009 | Yoshida | |
| 7,610,975 B1 | 11/2009 | Gust et al. | |
| 7,721,517 B2 | 5/2010 | Hunt et al. | |
| 7,728,534 B2 | 6/2010 | Lucas et al. | |
| 7,735,592 B2 | 6/2010 | Bellot et al. | |
| 7,878,279 B2 | 2/2011 | Hoogenraad | |
| 8,056,653 B2 * | 11/2011 | Hunt | B60W 10/08 180/6.24 |
| 8,191,342 B2 | 6/2012 | Ishii et al. | |
| 8,299,892 B2 | 10/2012 | Manita et al. | |
| 8,544,570 B2 | 10/2013 | Ishii et al. | |
| 8,662,600 B2 | 3/2014 | Koga et al. | |
| 8,742,606 B2 | 6/2014 | Kim et al. | |
| 8,769,917 B1 | 7/2014 | Howell | |
| 8,811,039 B2 | 8/2014 | The Ngo et al. | |
| 8,811,049 B2 | 8/2014 | Fornage | |
| 8,863,485 B2 | 10/2014 | Pitcel et al. | |
| 8,930,117 B2 | 1/2015 | Raasch | |
| 9,113,596 B2 | 8/2015 | Bricko et al. | |
| 9,155,247 B1 | 10/2015 | Force | |
| 9,210,839 B2 | 12/2015 | Schygge et al. | |
| 9,226,444 B2 | 1/2016 | Schygge et al. | |
| 9,282,695 B2 | 3/2016 | Goto | |
| 9,321,358 B2 | 4/2016 | Robins et al. | |
| 9,499,199 B1 | 11/2016 | Lyamon et al. | |
| 2005/0169025 A1 | 8/2005 | Huang et al. | |
| 2005/0207190 A1 | 9/2005 | Gritter | |
| 2005/0237774 A1 | 10/2005 | Lacaze et al. | |
| 2006/0090351 A1 | 5/2006 | Yoshida | |
| 2007/0007056 A1 | 1/2007 | Bowers et al. | |
| 2008/0031019 A1 | 2/2008 | Alexander | |
| 2008/0234096 A1 | 9/2008 | Joshi et al. | |
| 2008/0289309 A1 | 11/2008 | Gust et al. | |
| 2009/0091954 A1 | 4/2009 | Yamanaka | |
| 2009/0279338 A1 * | 11/2009 | Inagawa | H02M 5/271 363/160 |
| 2010/0005769 A1 | 1/2010 | Landry | |
| 2010/0034003 A1 | 2/2010 | Rozman et al. | |
| 2010/0067272 A1 | 3/2010 | Alexander | |
| 2011/0006545 A1 | 1/2011 | Himmelmann | |
| 2011/0241465 A1 * | 10/2011 | Anghel | H02K 7/006 310/114 |
| 2012/0182774 A1 | 7/2012 | Boecker et al. | |
| 2012/0320648 A1 | 12/2012 | Harrison et al. | |
| 2013/0167495 A1 | 7/2013 | Borinato | |
| 2013/0257319 A1 | 10/2013 | Akiyama et al. | |
| 2014/0257614 A1 * | 9/2014 | Niizuma | B60L 11/182 701/22 |
| 2015/0107914 A1 | 4/2015 | Zhao | |
| 2015/0130432 A1 | 5/2015 | Yamazaki et al. | |
| 2016/0014959 A1 | 1/2016 | Atsumi | |
| 2016/0014961 A1 | 1/2016 | Force | |

FOREIGN PATENT DOCUMENTS

JP 2007331454 A 12/2007
JP 2010206880 A 9/2010

OTHER PUBLICATIONS

Smartec "Integrated Electric LT Drive System Service and Repair Manual" Apr. 2010, pp. 1-52.
Smartec "Integrated Electric ZT Drive System Service and Repair Manual" Feb. 2012, pp. 1-52.
European Search Report for related European Application No. 16193829.5 dated Apr. 12, 2017.
Jacobsen. Eclipse 322, www.eclipse322.com/_media/pdf/EclipseBrochure.pdf, 2009.
Bhavsar et al., Topological Advancements in Matrix Converter Technology: A Review Paper, Dec. 2013, vol. 2, Issue 12, International Journal of Advanced Research in Electronics and Instrumentation.
Chen et al., Combined Device and System Simulation for Automotive Application using SABER, 2002, International Rectifier.
Kolar et al., Review of Three-Phase PWM AC-AC Converter Topologies, Nov. 2011, pp. 4988-5006, vol. 58, No. 11, IEEE Transactions on Industrial Electronics.
Nguyen-Quang et al., A Three-Phase to Single Matrix Converter for High-Frequency Induction Heating, Sep. 8-10, 2009, Power Electronics and Applications.

(56) References Cited

OTHER PUBLICATIONS

Szczesniak, Three-Phase AC-AC Power Converters Based on Matrix Converter Topology, Chapter 2: Review of AC-AC Frequency Converters, 2013, Springer.

* cited by examiner

SEGMENTED WAVEFORM CONVERTER ON CONTROLLED FIELD VARIABLE SPEED GENERATOR

CROSS REFERENCE TO RELATED APPLICATION

This application is a continuation-in-part under 37 C.F.R. § 1.53(b) of U.S. patent application Ser. No. 14/885,112 filed Oct. 16, 2015, the entire disclosure of which is hereby incorporated by reference.

FIELD

This application relates to the field of variable speed generators, and more specifically, an alternating current (AC) to AC converter for controlling the output of a controlled-field synchronous alternator on a variable-speed generator.

BACKGROUND

An engine-generator set, which may be referred to as a generator or a genset, may include an engine and an alternator or another device for generating electrical energy or power. One or more generators may provide electrical power to a load through a power bus. The power bus, which may be referred to as a generator bus or common bus, transfers the electrical power from the engine-generator set to a load. In many examples, the electrical load on the engine-generator set may vary over time.

The frequency of the output of a synchronous generator is based on the speed of the engine and the number of poles in the generator. In order to provide a constant output frequency, the prime mover may have to operate at a fixed speed. The engine may not need to operate at the fixed speed in order to provide enough power to supply the load, but does so to maintain frequency.

Although allowing the engine speed to decrease at light loads may reduce wear, fuel consumption, and sound emissions from the generator, converting the frequency is required in order to allow the engine speed to decrease from rated speed.

BRIEF DESCRIPTION OF THE DRAWINGS

Exemplary embodiments are described herein with reference to the following drawings.

DETAILED DESCRIPTION

Figure 1A:
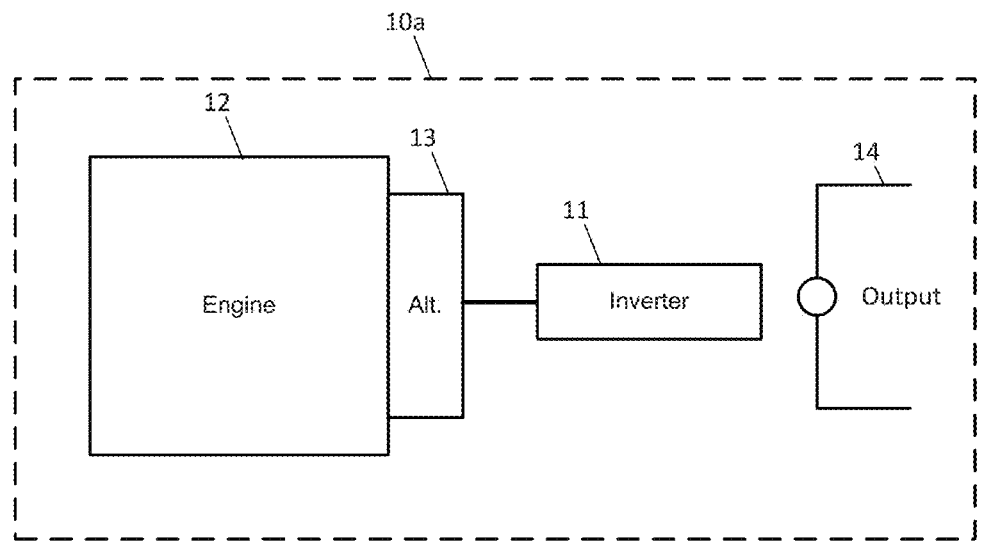
FIGS. 1A and 1B illustrate example engine-generator sets including one or more synchronous inverters.

An alternating current (AC) to AC converter converts an AC signal or waveform to another AC signal having a different or changed electrical property. The changed electrical property may be voltage, frequency, or another property. Example types of AC to AC converters include cycloconverters, matrix converters, and hybrid converters. A cycloconverter converts the input waveform to a lower frequency output signal by synthesizing segments of the input waveform without a direct current link. Cycloconverters may use silicon controlled rectifiers (SCRs) as switches to synthesize the inputs. Matrix converters utilize a network of transistors to similarly synthesize segments in a piecewise manner in order to generate the desired output waveform. Hybrid converters may combine a combination of the two approaches. Although frequency converters or cycloconverters may allow for correction of the frequency, they operate to control the output of the generator without control of the input.

Any of these examples may be referred to collectively as a segmented waveform converter. The segmented waveform converter may generate a single phase output from a multiple phase input. The output of the segmented waveform converter may be a four-quadrant output as the segmented waveform converter can transfer both real power and reactive power in either direction through the segmented waveform converter. The segmented waveform converter generates the output waveform one segment at a time by directly passing a combination of one or more of the input signals. Appropriate filtering of the input waveform may be used to remove high-frequency ripple, switching noise, and undesirable distortion of the output. The output waveform is created from sequential piecewise sampling of the input voltage. The frequency of the sampling defines the length of the segments. The frequency of the sampling may be significantly higher than the frequency of the input waveform and the output waveform. For example, an input frequency of 200 Hz and an output frequency of 60 Hz may require a sampling and switching frequency of 20 kHz in order to provide acceptable output power quality.

An additional advantage realized from the segmented waveform converter, as opposed to conventional inverters, is that lower rated components may be used. The segmented waveform converter uses more switching elements between the source and load than conventional rectifiers. Thus, on average, less current must go through each of the switching elements, and the switching elements may have a smaller current or power rating. Lower rated components may be much less costly. The segmented waveform converter may be electrically connected to one or more filters and configured to provide a filtered output to a variety of loads. Such a segmented waveform converter may be referred to as a synchronous inverter herein.

It is preferred to allow the cycloconverter to control the input voltage and frequency in addition to the output voltage in order to optimize efficiency and provide protection for components in the cycloconverter. In addition, many cycloconverters generate total harmonic distortion (THD) on the output voltage due to switching and commutation noise. This THD can be undesirable depending on the application.

FIG. 1A illustrates an example engine-generator set 10a including a synchronous inverter 11, an engine 12, and an alternator 13. The synchronous inverter may include at least one controller (i.e., microprocessor) for controlling a network of switches of a segmented waveform converter. The alternator 13 may be a controlled field alternator in which a field current is actively controlled by a generator controller (field current controller) to adjust the output of the alternator 13. The synchronous inverter controller and the field current controller may be the same device or different devices. The output device 14 of the synchronous inverter provides the output waveform to a load or another device.

The controlled field alternator 13 is configured to generate a poly-phase signal through operation of the engine 12. The controlled field alternator 13 may include an exciter armature for generating a field current. As the exciter armature is rotated in a magnetic flux, a time varying voltage is induced in the windings of the exciter armature. The output from the exciter armature is connected to the main field portion of generator. The connection may be made with or without brushes and slip rings. The field current of the output of the exciter provides a magnetic field in rotor field of the generator. As the field portion of the alternator is rotated relative to the stator, a magnetic flux is passed through and across the alternator stator windings producing time varying voltage. The field current from the exciter armature output may be rectified or otherwise controlled.

The output of the alternator 13 may be a three phase signal. The phases of the poly-phase signal may be offset one another by a predetermined angle (e.g., 120 degrees or 2*Pi/3 radians). The poly-phase signal may vary with respect to amplitude and frequency.

The controlled field alternator 13 provides the poly-phase signal to the segmented waveform converter of the synchronous inverter 11, which may include a matrix cycloconverter. The segmented waveform converter includes a network of switches that selectively controls passing a combination of the components of the poly-phase signal to the output 14. For example, consider an example in which the poly-phase signal includes two components, A and B. The network of switches could provide several combinations of the two components to the output, which may include only the A component, only the B component, an additive signal of A+B, a subtracted signal of A−B or B−A, and 0 or a null signal, which may be achieved by A-A or B-B.

Before the output 14, the synchronous inverter 11 may include an output filter and electrical quantities may be measured by the controller at the output filter by one or more sensors. The controller of the synchronous inverter 11 may be configured to provide a control signal for the network of switches based on measured electrical quantities associated with the output filter and provide a field current control signal to the controlled field alternator.

The controller may receive the electrical quantities from at least one sensor. The controller may perform a calculation or consult a lookup table to determine a combination of the components of the poly-phase signal to pass to the output 14. In one example, a lookup table relates combinations of available voltages to different settings for the plurality of switches. The available voltage may change over time. In one example, the available voltages vary according to a time-based schedule of expected values. In another example, the available voltages vary according to measured values.

Figure 1B:
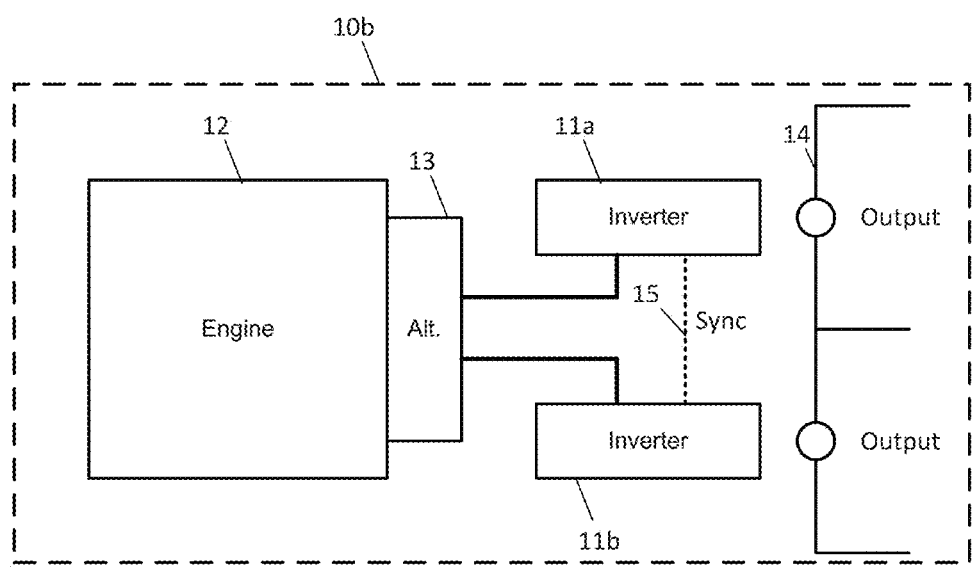

FIG. 1B illustrates another example engine-generator set 10b including two synchronous inverters 11a and 11b, an engine 12, and an alternator 13. The two synchronous inverters 11a and 11b may be connected through a synchronization path 15.

Both synchronous inverters 11a and 11b are fed by alternator 13 and are configured to synchronize their output waveforms using the sync signal on the synchronization path 15 between synchronous inverters 11a and 11b. The sync signal may include a digital signal which may indicate a peak, a positive-going or negative-going zero-crossing on the target voltage waveform, or another element of the internal target signal. The sync signal may include an analog signal, indicating a target waveform, a phase angle indicator, or another element of the target output waveform.

The sync signal may be a communications signal communicating a target voltage, target frequency, real load, reactive load, apparent load, zero-crossing timestamp, time synchronization signal, or other information related to the measured output waveform, the target output waveform, or the input to the inverter from the alternator. In one example, one of the synchronous inverters 11a detects a zero crossing and slope of the output of synchronous inverter 11a, which is sent to the other synchronous inverter 11b using the sync signal. The other synchronous inverter 11b may introduce a delay in order to synchronize with the synchronous inverter 11a. Various techniques may be used to synchronize the synchronous inverters.

Figure 2:
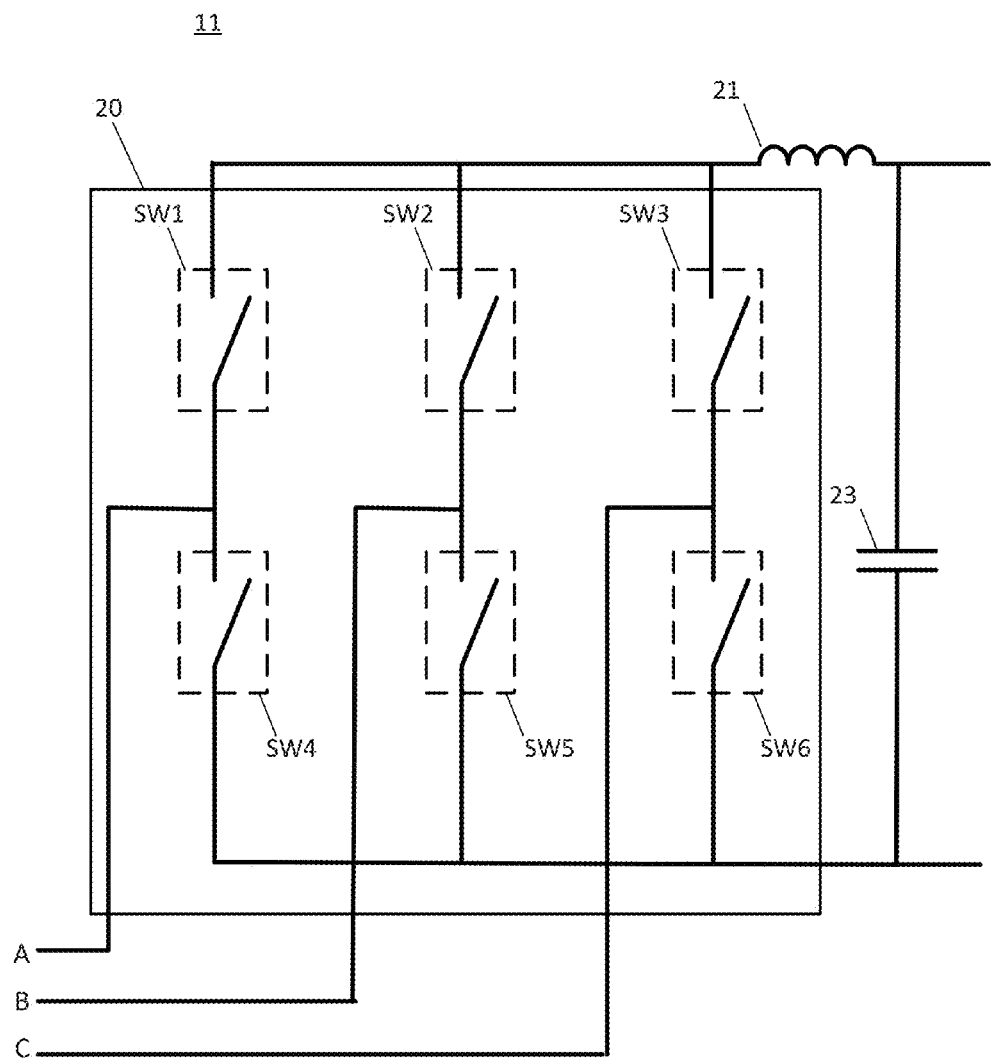
FIG. 2 illustrates an example single phase segmented waveform converter.

The supplies from the alternator 13 to the synchronous inverters 11a and 11b may be magnetically isolated from each other to allow connection of the inverters in series, the two inverters may allow for connection in a center-tap configuration, allowing 120 or 240 output voltage as desired. FIG. 2 illustrates an example synchronous inverter 11 including segmented waveform converter 20. The segmented waveform converter 20 includes a network of switches SW1-6 and at least one energy storing device. The example shown in FIG. 2 includes an inductor 21 and a capacitor 23. The inputs, A, B, and C, to the segmented waveform converter 20 are components of the poly-phase AC waveforms.

In one example, the segmented waveform converter 20 is configured to supply a control signal to each of the switches for any combination of two or fewer of the components of the poly-phase input waveform. The control signal may include A, B, C, A-B, A-C, B-C, B-A, C-B, C-A, and 0. Other switch configurations may be configured to provide other combinations, such as additive combinations A+B, B+C, and A+C, using a switch configuration other than that illustrated. In another example, the segmented waveform converter 20 is configured to supply a predetermined set of outputs based on combinations of the components of the poly-phase input waveform. The predetermined set of outputs may include a subtractive combination of exactly two of the components, including A-B, A-C, B-C, B-A, C-B, and C-A. The predetermined set of outputs may include 0, any single component (A, B, or C) or any subtractive combination of exactly two of the components.

The controller may access a target output level as a function of time. For example, the target output may be an AC waveform at a specific frequency and/or a specific amplitude. The target output level may be stored as a series of time based target values. For example, time values are associated with target output levels (e.g., {time1, output1}, {time2, output2}). The target output level may follow a sinusoidal function, and the target output levels may be computed based on a specified voltage and frequency for the output.

The controller may calculate a target electrical parameter for the output filter. In one example, the controller calculates a target current for the inductor 21, and in another example, the controller calculates a target voltage for the capacitor 23. The controller may calculate a desired change in the electrical parameter based on a measured quantity (e.g., voltage or current) at the output filter. The controller may calculate a change value (delta) based on the difference between the target output level and the current measured quantity. The controller may compare the change values to the available output segments from the combinations of components and selects the closest combination.

TABLE 1

| Time | A-B | B-C | C-A | B-A | C-B | A-C | Target |
|------|-----|-----|-----|-----|-----|-----|--------|
| 1 | 49 | 163 | −212 | −49 | −163 | 212 | 110 |
| 2 | −80 | −135 | 215 | 80 | 135 | −215 | 168 |
| 3 | −197 | 173 | 24 | 197 | −173 | −24 | 18 |
| 4 | 201 | −25 | −176 | −201 | 25 | 176 | −150 |
| 5 | −94 | 230 | −136 | 94 | −230 | 136 | −170 |
| 6 | 196 | −189 | −7 | −196 | 189 | 7 | −75 |

Different switch combinations correspond to different output ranges. For example, at time interval 3 on Table 1, combination C-A provides 24V, which is closest to the target at time interval 3 (18). In another example, at time interval 2, combination C-B provides 135, which is the closest to the target at time interval 2 (168). For each time interval, the controller selects one of the possible combinations. Only six combinations are shown, but more combinations are possible. A lookup table based on a single phase measurement may be used. Alternatively, each phase may be measured and compared. The controller may compare the possible combinations to the target value and select the closest combination. The controller generates a field current control signal for the selected combination. The controller may output an individual control signal for each of the switches SW1-6. Each switch SW1-6 may be either on or off. Each of the combinations represents different current paths through the segmented waveform converter.

As another example, the controller may select the switch combination that provides that largest voltage to the output and determine a pulse width modulated (PWM) duty cycle to operate between that switch combination and a freewheeling state. The PWM duty cycle may be chosen based on a ratio between the target voltage and the available voltage, a predetermined sequence, a closed-loop output voltage controller, a model-based control of the output, or a similar technique.

The controller may determine whether the closest available combination is within a threshold difference to the target. When the closest available combination is farther away from the target than the threshold, the controller may apply PWM control to adjust the signal. For example, a PWM duty cycle may be applied to the closest combination to approach the target. In another example, when the closest available combination is farther away from the target than the threshold, the controller first selects the available combination that is greater than the target. Then, the controller applies a PWM duty cycle to adjust the selected combination to approach the target. The PWM duty cycle may be calculated according to Equation 1.

$$\text{PWM Duty Cycle} = \text{Target/Selected Combination Output} \qquad \text{Eq. 1.}$$

For example, consider the example at time interval 2, combination C-B provides 135, which is the closest to the target at time interval 2 (168). The controller may revert to the next largest output (215) from combination (C-A). Using Equation 1, the PWM duty cycle would be (168/215)=0.78 or 78%. In one example, the PWM duty cycle may be finely tuned (e.g., every 1%). In another example, a few examples are available and the closest PWM duty cycle is selected. For example, when five duty cycles are available, the options may be 20%, 40%, 60%, 80%, and 100%. In the example above, when equation 1 provides 78%, the PWM duty cycle of 80% is selected.

Table 2 illustrates example control signals for each of the switches in order for the segmented waveform converter 20 to provide the various output levels or combination of components of the poly-phase signal. The controller may include an output pin for each of the switches to provide the individual control signals to the switch. In another example, the segmented waveform converter 20 may include a switch controller that receives a bitwise signal according to rows of Table 2. For example, each series of bits corresponds to a set of control signals in the format {SW1, SW2, SW3, SW4, SW5, SW6}.

TABLE 2

|       | SW1 | SW2 | SW3 | SW4 | SW5 | SW6 |
|-------|-----|-----|-----|-----|-----|-----|
| A-B   | 1   | 0   | 0   | 0   | 1   | 0   |
| A-C   | 1   | 0   | 0   | 0   | 0   | 1   |
| B-C   | 0   | 1   | 0   | 0   | 0   | 1   |
| B-A   | 0   | 1   | 0   | 1   | 0   | 0   |
| C-B   | 0   | 0   | 1   | 0   | 1   | 0   |
| C-A   | 0   | 0   | 1   | 1   | 0   | 0   |
| 0 or A-A | 1 | 0   | 0   | 1   | 0   | 0   |
| 0 or B-B | 0 | 1   | 0   | 0   | 1   | 0   |
| 0 or C-C | 0 | 0   | 1   | 0   | 0   | 1   |

The controller may calculate a target electrical parameter for the output filter. In one example, the controller calculates a target current for the inductor 21, and in another example, the controller calculates a target voltage for the capacitor 23. The controller may calculate a desired change in the electrical parameter based on a measured quantity (e.g., voltage or current) at the output filter. The controller calculates a change value (delta) based on the difference between the target output level and the measured quantity. The controller compares the change values to the available output segments from the combinations of components and selects the closest combination.

The filter components Inductor 21 and capacitor 23 may be selected to minimize THD on the output of the inverter. They may also be selected based on a target switching frequency of the segmented waveform converter. The filter components may be replaceable or integral to the design. The filter components may be different based on target output voltages and frequencies from the inverter. As an example, the inductor 21 may be decreased in size when the output frequency increases. As another example, the capacitor may be increased in size for a lower voltage application. The filter components may vary by application, such as decreased filter size when feeding a motor load or increased filter size when feeding a sensitive load.

The filter components may also enable the inverter to control short-circuit current by limiting the rate that the current through the switch can rise. The current control may provide a sinusoidal, trapezoidal, saw-tooth, triangular, DC, square-wave or otherwise shaped output current into a short circuit. The frequency of the output current into a short circuit may differ from nominal frequency. The current control may provide a high level of output current slowly decreasing to a lower level of output current. As an example, the current control may provide 300% of rated generator current into a short circuit for 2 seconds, then decrease the output current to 100% of rated current over the next 5 seconds. As another example, the current control may provide 300% of rated generator current into a short circuit for 5 seconds, then stop sourcing current.

Figure 3A:
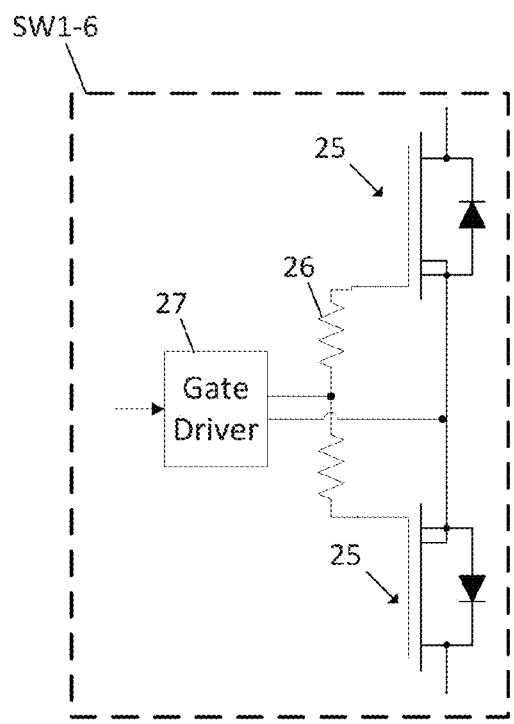
FIGS. 3A and 3B illustrate example switches for the segmented waveform converter.

FIG. 3A illustrates example switches SW1-6 for the segmented waveform converter 20. The switches SW1-6 include a pair of transistors 25 (e.g., metal-oxide-semiconductor field-effect transistors or MOSFETs) which are controlled by a gate driver 27 through one or more gate resistors 26. The sources of the transistors 25 may be directly electrically connected. The switches may also utilize a plurality of transistors connected in parallel in order to increase the current rating or to decrease the losses in the power conversion.

The switches are configured such that they block current traveling in either direction. This allows the segmented waveform converter to switch between two AC waveforms. The body diode, if present, on each transistor can conduct when the transistor is conducting in one direction, so the voltage drop across one transistor is typically lower than the other. The gate driver circuit provides the necessary isolation to allow the sources of the switches to float relative to the input and output of the converter, while providing a voltage or current referenced to the sources to trigger the switch. The gate drivers pass a digital signal from the controller to the actual switch.

Figure 3B:
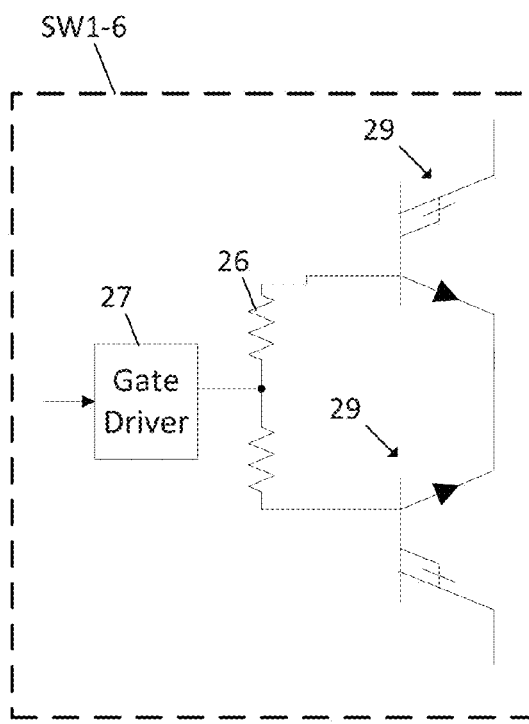

FIG. 3B illustrates another example switches SW1-6 for the segmented waveform converter 20. The switches SW1-6 include a pair of transistors 29 (e.g., insulated-gate bipolar transistor (IGBT) or another three-terminal power semiconductor device.) The emitters of the transistors 29 may be directly electrically connected. The switches may also utilize a plurality of transistors connected in parallel in order to increase the current rating or to decrease the losses in the power conversion. The emitters may be connected using paralleling resistors if the thermal characteristics of the IGBTs are not conducive to paralleling.

The switches are configured such that they block current traveling in either direction. This allows the segmented waveform converter to switch between two AC waveforms. The body diode on each transistor can conduct when the transistor is conducting in one direction, so the voltage drop across one transistor is typically lower than the other. The gate driver circuit provides the necessary isolation to allow the emitters of the switches to float relative to the input and output of the converter, while providing a voltage or current referenced to the emitters to trigger the switch. The gate drivers pass a digital signal from the controller to the actual switch.

Figure 4:
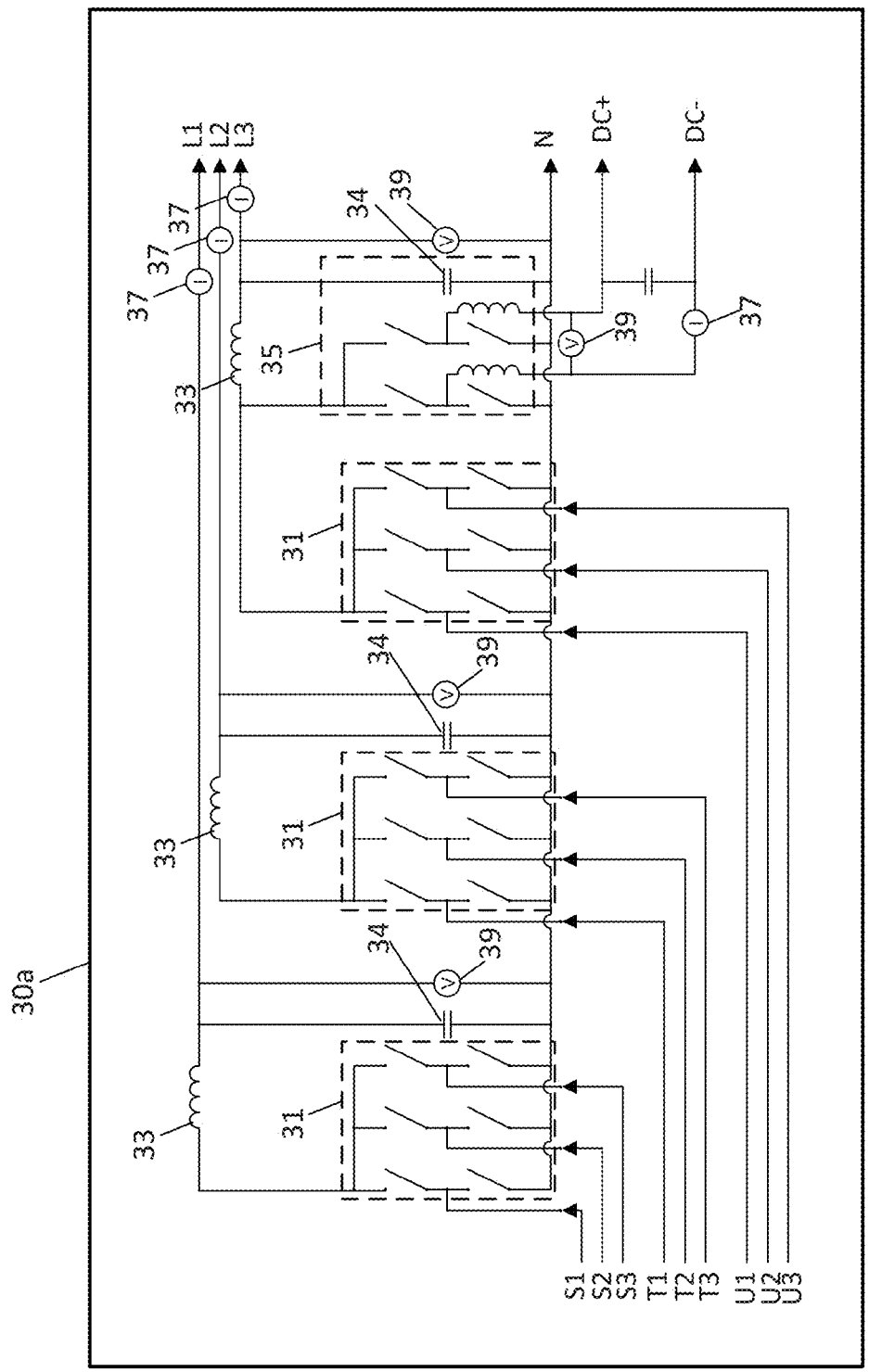
FIG. 4 illustrates an example three phase segmented waveform converter with alternator field current control.

FIG. 4 illustrates an example network 30*a* of segmented waveform converters. The inputs to the network 30*a* include S1, S2, and S3 for the first segmented waveform converter, T1, T2, and T3 for the second segmented waveform converter, and U1, U2, and U3 for the third segmented waveform converter. The outputs of the network 30 include one output line (L1, L2, L3) for each of the segmented waveform converters. The energy storing devices 33, which may be inductors, in combination with energy storing devices 34, which may be capacitors, combine to form an output filter. The measurement points 37, for current, and 39, for voltage, illustrate example locations on the network 30 where electrical quantities may be measured for controlling the segmented waveform converters. Other voltage and current measurement locations may be utilized. A circuit 35 includes a field current power supply for generating a field current (DC+, DC−) that is transmitted back to the field coils of the alternator.

Figure 5:
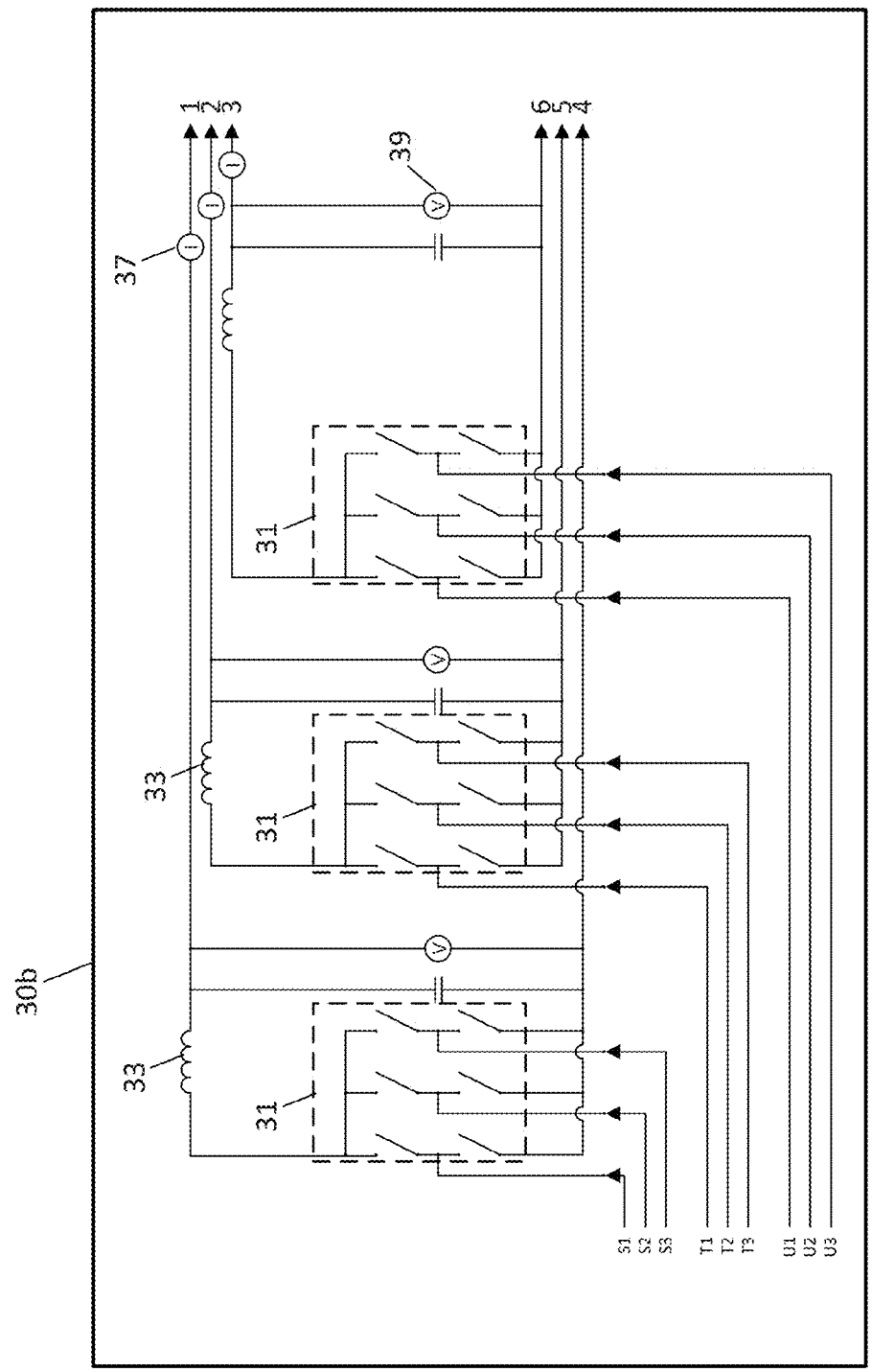
FIG. 5 illustrates another example three phase segmented waveform converter.

In FIG. 4 each of the segmented waveform converters share the neutral connection (N). Thus, each of L1 and L2 and L3 can be connected only in parallel or in a three-phase wye configuration. FIG. 5 illustrates another example three phase segmented waveform converter in which each of the segmented waveform converters are independent and can be connected in any configuration.

Each of the converters is capable of providing a single-phase AC output, but the phase between the outputs may be fixed such that the network of converters produces a polyphase AC output. For example, the output of the three converters, between 1 and 4, 2 and 5, and 3 and 6, may be fixed at 120 electrical degrees apart, providing three phase power. As another example, the three outputs, between 1 and 4, 2 and 5, and 3 and 6, may all produce voltage at the same phase angle, allowing them to be connected in parallel to provide increased current sourcing capability in a single-phase application. In yet another example, one of the three outputs, 3 and 6, could produce voltage at 180 electrical degrees from the other two, 1 and 4, 2 and 5, allowing center-tap single-phase output voltages such as 120/240. In this case, one of the output lines from the generator has double the current rating of the other output line because two converters are connected in parallel. In another example, outputs 1 and 4 may be 180 electrical degrees from 2 and 5 with 3 and 6 at the same phase angle as 1 and 4 with twice the magnitude. This enables center-tap single-phase output voltages with balanced line current ratings but only half the line current is available from the neutral connections. This final configuration may require higher voltage switches for the converter, 31, connected to inputs U1, U2, U3.

Figure 6B:
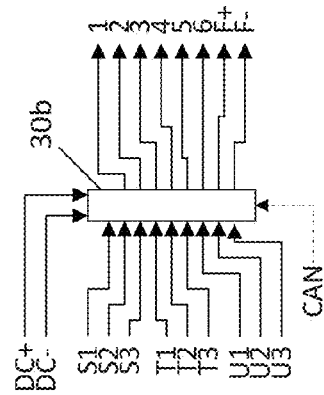
FIG. 6B illustrates an example pin diagram for an integrated circuit for the segmented waveform converter of FIG. 5.
Figure 6C:
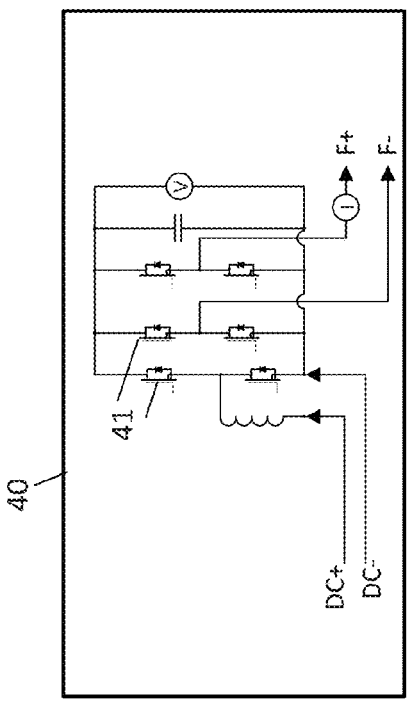
FIG. 6C illustrates an example power supply for supplying current to the alternator field.
Figure 6A:
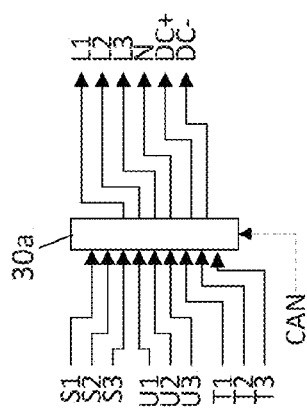
FIG. 6A illustrates an example pin diagram for an integrated circuit for the segmented waveform converter of FIG. 4.

FIG. 6A illustrates an example pin diagram for a circuit package or integrated circuit for a network of segmented waveform converters 30a. The inputs to network 30a, which are S1, S2, S3, U1, U2, U3, T1, T2, and T3, are on one side of the circuit package, and the line outputs L1, L2, and L3, neutral line N, and field current outputs DC+, DC− are on the other side of the circuit package. The controller area network (CAN) provides a control input to the circuit package in order to set the output. The control input may be the bitwise switch settings describe above (e.g., {SW1, SW2, SW3, SW4, SW5, SW6}) or the control input may be a target output, and the switch settings are controlled internal to the circuit package.

FIG. 6B illustrates an example pin diagram for a similar circuit package or integrated circuit for the network of segmented waveform converters 30b. The inputs to network 30b, which are S1, S2, S3, U1, U2, U3, T1, T2, and T3, are on one side of the circuit package, and the differential outputs 1, 2, 3, 4, 5, and 6, and field current outputs F+, F− are on the other side of the circuit package. As described above the CAN control input to the circuit package sets the output with either bitwise switch settings or a target output level.

FIG. 6C illustrates an example power supply 40 for controlling the field current. The field current power supply 40 may be used in combination with the circuit of FIG. 5 or in lieu of circuit 35 in FIG. 4. The power supply 40 includes an array of transistors 41 and a switching power supply for stepping up the voltage.

The network of waveform converters provides an output to control the field on the alternator 13, allowing the converters to control supply voltage(s). The field on the alternator 13 may be supplied by a high-voltage DC bus, generated from battery voltage by a DC-DC converter. Control of the supply voltage may allow for improved efficiency, decreased stress on components, broader output voltage range, and improved control under short-circuit conditions, among other benefits.

In any of the examples above, the synchronous inverters may be connected to provide two equally-rated (e.g., 120V) power supplies or the synchronous inverters may be connected in a variety of configurations. The inverters are in communication via a synchronization signal between them to allow the inverters to provide synchronized output voltage. In this case, the two inverters provide a very versatile range of output voltages, allowing a single generator package to be used in a variety of applications.

Figure 7A:
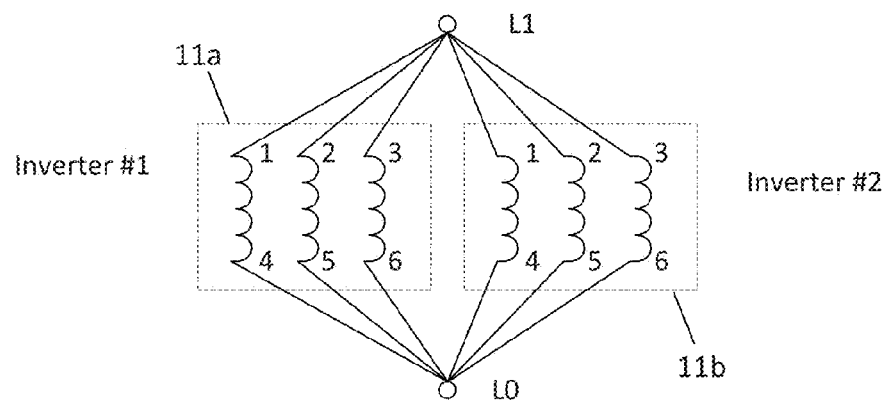
FIGS. 7A and 7B illustrate example single phase wiring diagrams for synchronous inverters.
Figure 7B:
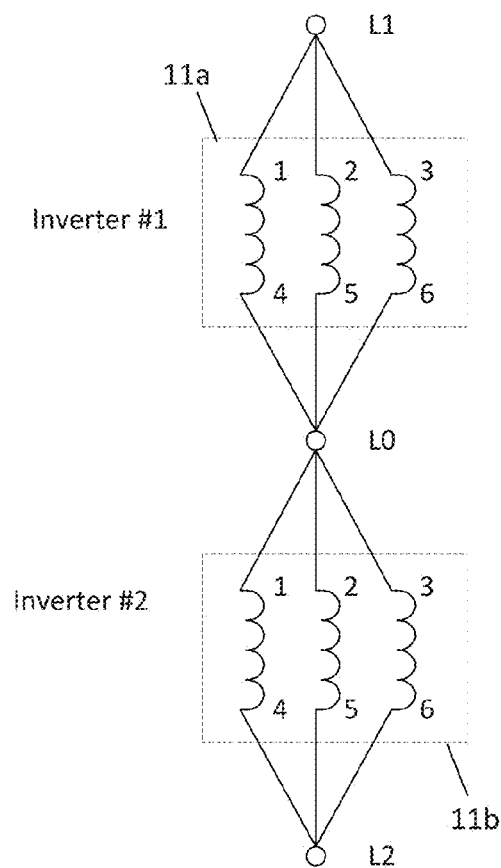

FIGS. 7A and 7B illustrate example single phase wiring diagrams for synchronous inverters that may be achieved by the segmented waveform converters of either FIG. 4 or FIG. 5. FIG. 7A illustrates circuitry as a means for connecting a low voltage (e.g. 120 VAC), single-phase output. FIG. 7B illustrates circuitry as a means for connecting a nominal voltage (e.g. 220 or 240 VAC) for a single-phase configuration.

Figure 8A:
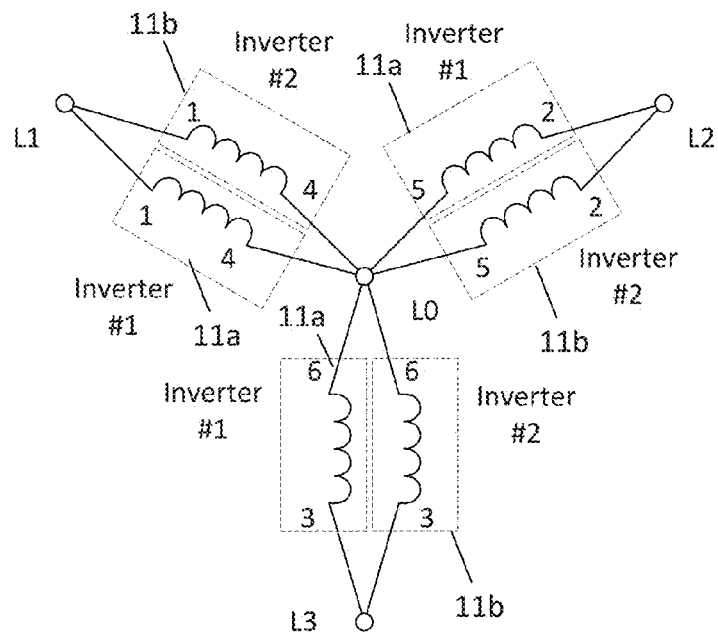
FIG. 8A illustrates an example low wye wiring diagram for synchronous inverters.
Figure 8B:
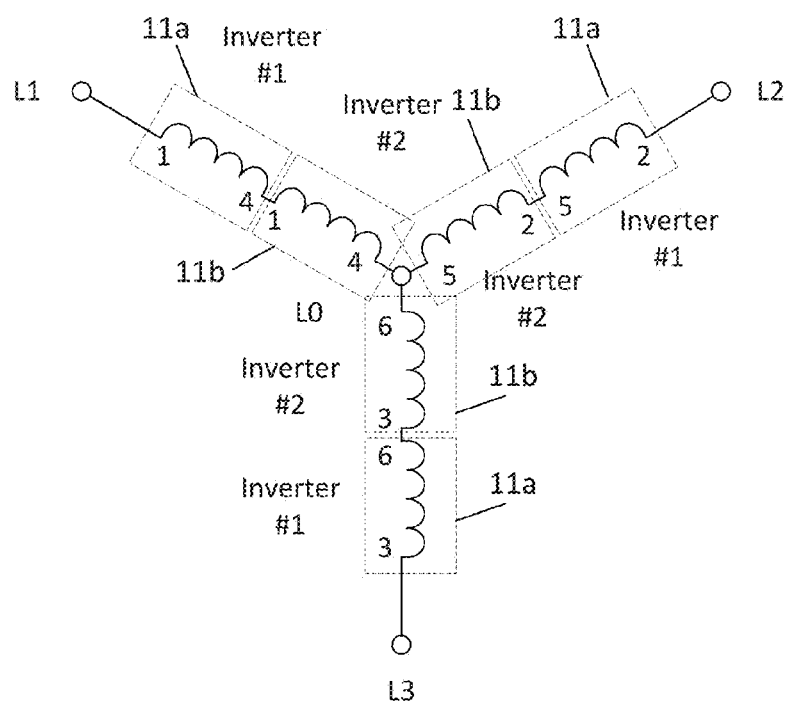
FIG. 8B illustrates an example high wye wiring diagram for synchronous inverters.
Figure 9:
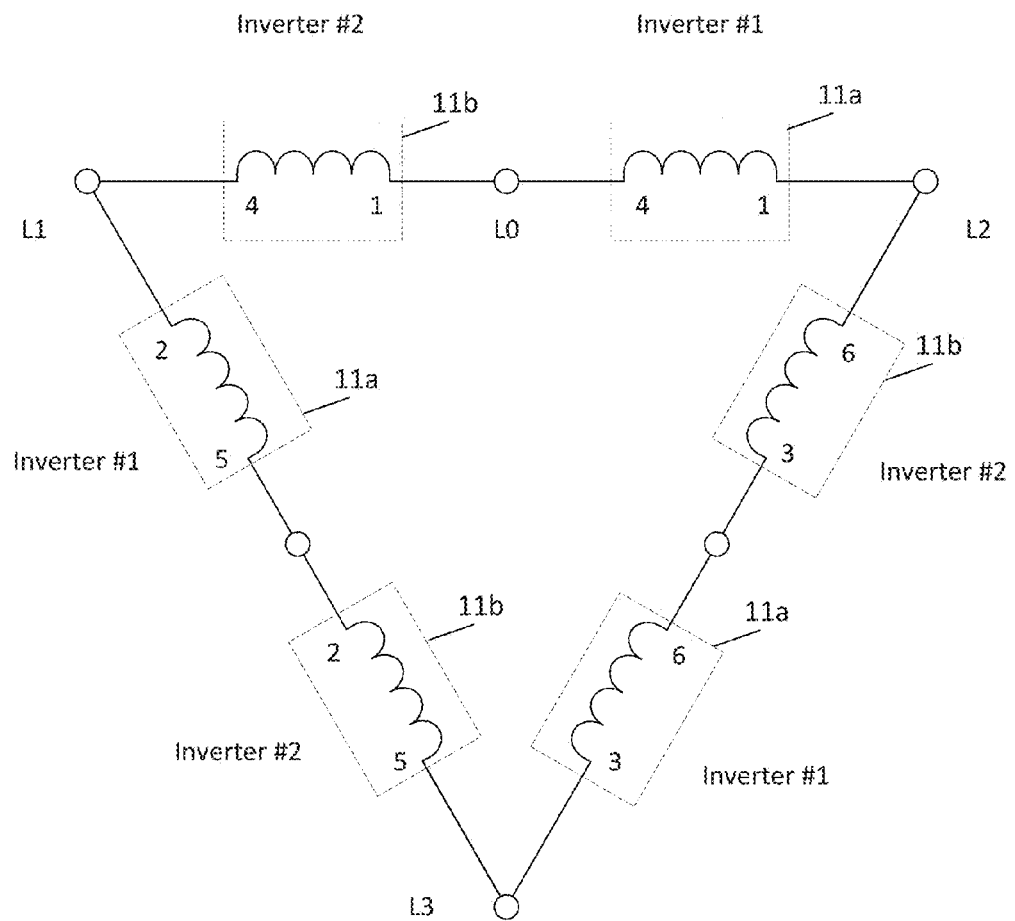
FIG. 9 illustrates an example low delta wiring diagram for synchronous inverters.

FIG. 8A illustrates circuitry as a means for connecting a Low Wye (e.g. 120/208 VAC) three-phase configuration that may be achieved by the segmented waveform converters of either FIG. 4 or FIG. 5. FIG. 8B illustrates circuitry as a means for connecting a High Wye (e.g. 230/400 or 277/480 VAC) three-phase configuration that may be achieved by the segmented waveform converters of FIG. 5. FIG. 9 illustrates circuitry as a means for connecting a center-tap Delta (e.g. 120/240/208 VAC) three phase configuration that may achieved by the segmented waveform converters of FIG. 5.

Figure 10:
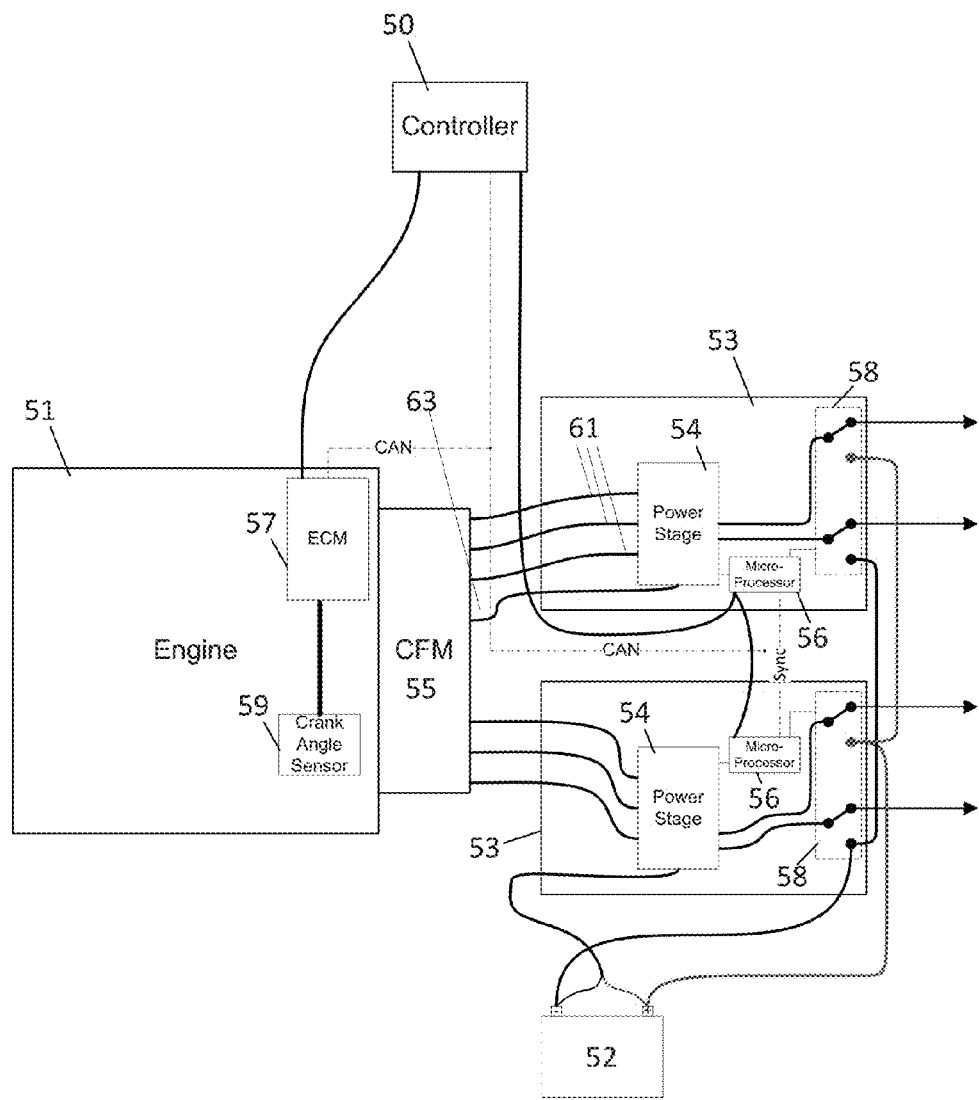
FIG. 10 illustrates a synchronous inverter generator configured to crank the engine using the alternator and synchronous inverter.

FIG. 10 illustrates an example engine-generator set including an engine 51, a battery 52, a controlled field machine (CFM) 55, two segmented waveform converters 53, and a generator controller 50. Each of the segmented waveform converters 53 includes a power stage 54, a microprocessor 56, and a cranking switch 58. The engine 51 includes or is electrically connected with an engine control module (ECM) 57 and a crank angle sensor 59. The power stage 54 includes the array of switches for receiving the CFM outputs 61 that feed into the segmented waveform converters 53 and the field current line 63 to supply field current back to the CFM 55. The CFM 55 may be an alternator or another rotary device that is controlled by an electrical field. Additional, different, or fewer components may be included in the genset.

The synchronous inverter 53 may be used to initiate engine rotation (crank the engine 51). The synchronous inverter 53 receives battery power from battery 52 on the normal AC output and provides an AC voltage waveform on the alternator stator windings, generating a rotating magnetic flux in the stator. The rotating magnetic flux on the stator may generate a torque on the rotor. The generated torque causes the engine to spin, causing air and fuel to be compressed in the cylinders and allowing the engine to initiate combustion (start).

Based on the layout of the segmented waveform converter, the switches allow for bi-directional power flow. Given this configuration, it may be possible to provide a signal that allows the alternator to act as a motor to rotate the engine. The alternator may act as an induction machine using damper windings in the rotor, induced current in the rotor field winding, reluctance variation between the rotor and stator, magnetic hysteresis in the rotor, or eddy currents generated in the rotor steel or laminations. The alternator may also act as a synchronous machine by exciting the rotor field, by rectifying induced voltage in the rotor field, or providing a permanent magnet rotor. The rotor field may be excited by an AC voltage, a DC voltage, or a combination of AC and DC voltage. The rotor field supply may couple through the exciter armature when the rotor is stationary.

The generator controller 50 is configured to provide a start signal to the segmented waveform converter 53. In addition to the start signal, the segmented waveform converter 53 may receive a position signal of the rotational components relative to the stationary components to determine the speed and position of the engine. In some cases, the position signal may provide information to the segmented waveform converter 53 that allows the synchronization of the AC voltage applied to the alternator stator. The segmented waveform converter may also determine engine position by measuring back electromagnetic fields (EMF) from the stator windings, stator impedance, stator current, or another signal. In some cases, the output of the crank angle sensor 59 (an angle) may be fed directly into the synchronous inverter 53. In other cases, the crank angle sensor 59 may be read by the ECM 57 or generator controller 50 and the information communicated to the synchronous inverter 53.

The engine cranking may be performed by one or more of the segmented waveform converters. The converters may share the cranking load simultaneously, share the cranking load by switching converters occasionally, or some combination of the two techniques. The converter to supply the cranking current may be chosen based on a temperature of each converter, the time that the converter has supplied the current, in order to assess functionality of the components on each converter, or for another reason.

The engine cranking may also be performed by a separate converter or a three-phase inverter. The separate inverter may be part of the segmented waveform converters or a separate converter. The separate converter may connect to a dedicated set of windings on the alternator. The dedicated set of windings on the alternator may be galvanically isolated from the windings connected to the segmented waveform converters. The dedicated set of windings may have a different number of turns than the main windings. The dedicated set of windings may be used to recharge the battery that supplies the cranking current.

The engine cranking may be performed by controlling the frequency and amplitude of the applied voltage. The engine cranking may be performed by controlling the voltage and phase angle between the rotor and stator. The engine cranking may be performed by controlling the torque applied to the engine 51. The torque applied to the engine can be measured from the phase angle between the current and voltage, the amplitude of the current, the amplitude of the voltage, the engine speed, or other characteristics of the stator or rotor.

Figure 11A:
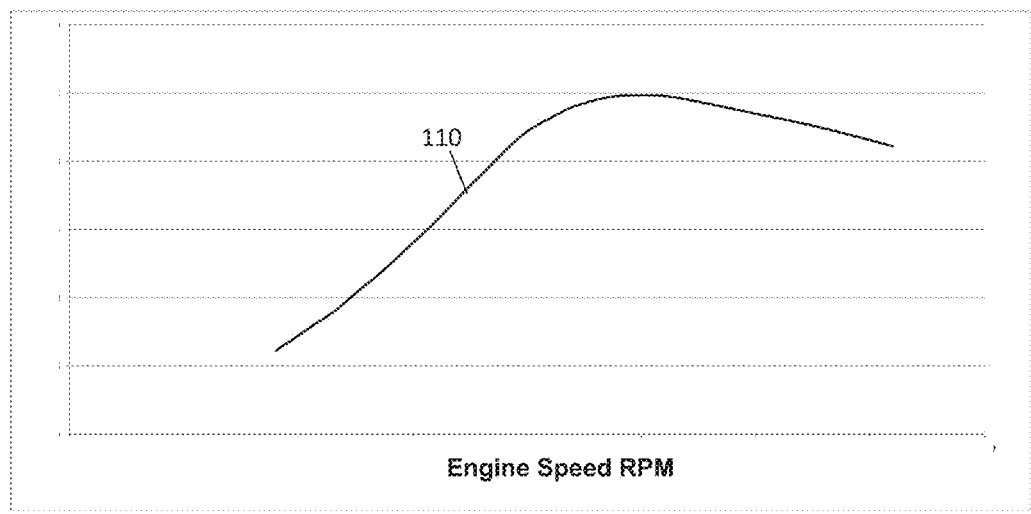
FIG. 11A illustrates an example engine torque curve.

FIG. 11A illustrates a chart for engine gross torque for an example engine-generator set including a synchronous inverter. As shown by plot 110, the engine provides increasing torque as the speed increases for most of the operating speed of the engine. Due to the torque output limitations of the engine, it may be difficult to accelerate the engine quickly from a lower speed. In addition, accelerating from a lower speed may take longer because of the infrequency of combustion events.

The engine torque produced may be significantly less than is indicated in FIG. 11A, depending on the torque demanded by the alternator. The engine output torque may be controlled by controlling the fuel supply to the engine. The engine output torque may be controlled by controlling the air supply to the engine. The torque demanded by the alternator may increase with increasing electrical load. The engine speed may decrease if the alternator torque exceeds the engine torque produced. The engine speed may increase if the engine torque exceeds the alternator torque. The alternator torque may have to be limited to a level slightly below the engine torque in order to allow the engine to accelerate.

Figure 11B:
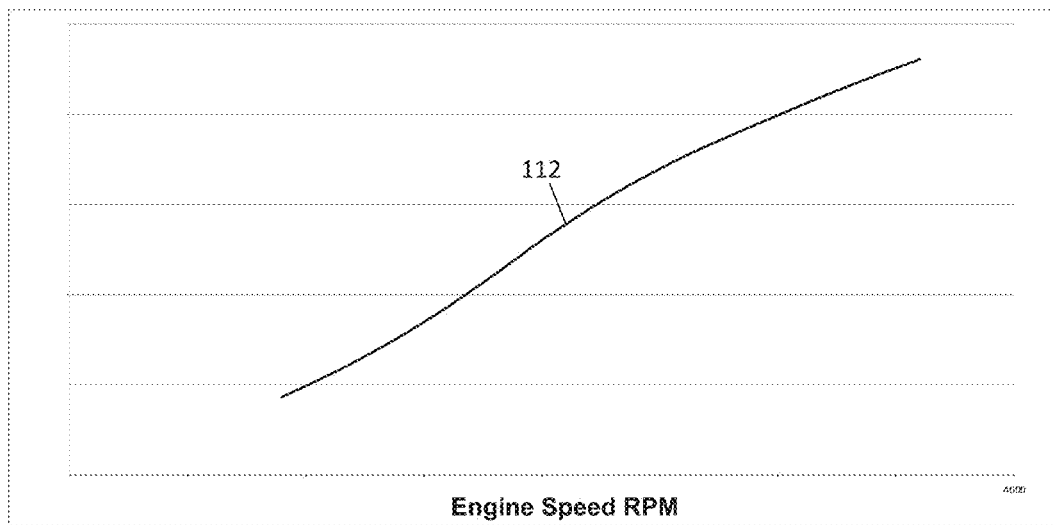
FIG. 11B illustrates an example power curve for an engine.

FIG. 11B illustrates a chart for engine power for an example engine-generator set including a synchronous inverter. As shown by plot 112, the engine speed may increase in order to provide enough power to meet the load demand. The engine speed may be controlled by controlling the torque output of the engine. In order to allow the engine speed to increase, the synchronous inverter may have to reduce output voltage temporarily. If the engine is unable to provide enough power to supply the load, the inverter may have to reduce output voltage temporarily.

The engine may operate at a fixed speed, with the output voltage controlled by adjusting the field current. The engine may operate at a variable speed with the output voltage controlled by adjusting the engine speed. The engine may operate at a combination of fixed speed and variable speed, with the output voltage controlled by a combination of adjusting the speed and adjusting the field current. The output frequency of the alternator may be controlled by adjusting the engine speed. The synchronous inverter may increase the frequency of the output voltage from that of the alternator. The synchronous inverter may decrease the frequency of the output voltage from that of the alternator. Different alternator and engine types require different means of controlling the input voltage to the synchronous inverter.

The synchronous inverter may control the output from the alternator in order to control the input voltage to the segmented waveform converter. Control of the alternator output may provide improved protection for switches in the converter, decreased THD on the output, improved efficiency, better durability, and improved response.

Figure 12A:
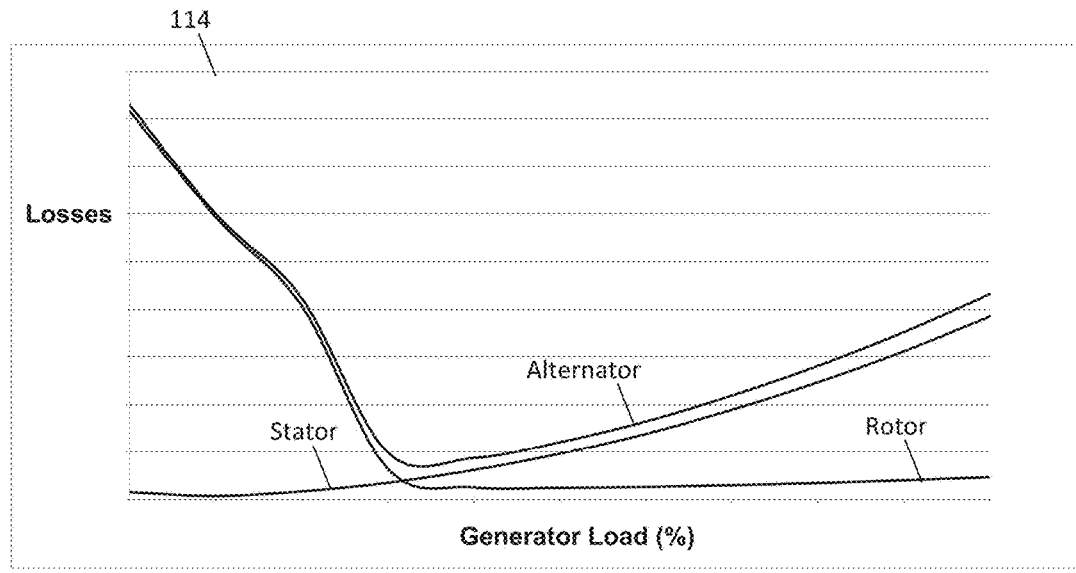
FIG. 12A illustrates a chart for alternator losses in an example controlled field alternator on a variable speed generator containing a synchronous inverter.

FIG. 12A illustrates a chart 114 for rotor and stator losses in an alternator on an example engine-generator set including a synchronous inverter. The example design uses a wound-field alternator to produce the voltage supply to the synchronous inverter and an ECM that allows adjustment of the engine speed. The rotor losses in the alternator may be at a maximum at low speed because the alternator is operating in saturation at low speed in order to allow maximum voltage generation at a minimum speed. The stator losses may increase due to increasing copper losses from current due to increasing load. The total losses may be at a maximum at no load because the system efficiency is not important at no load. The system losses may be at a minimum at 30% load because 30% load is the most common operating point for the generator.

Figure 12B:
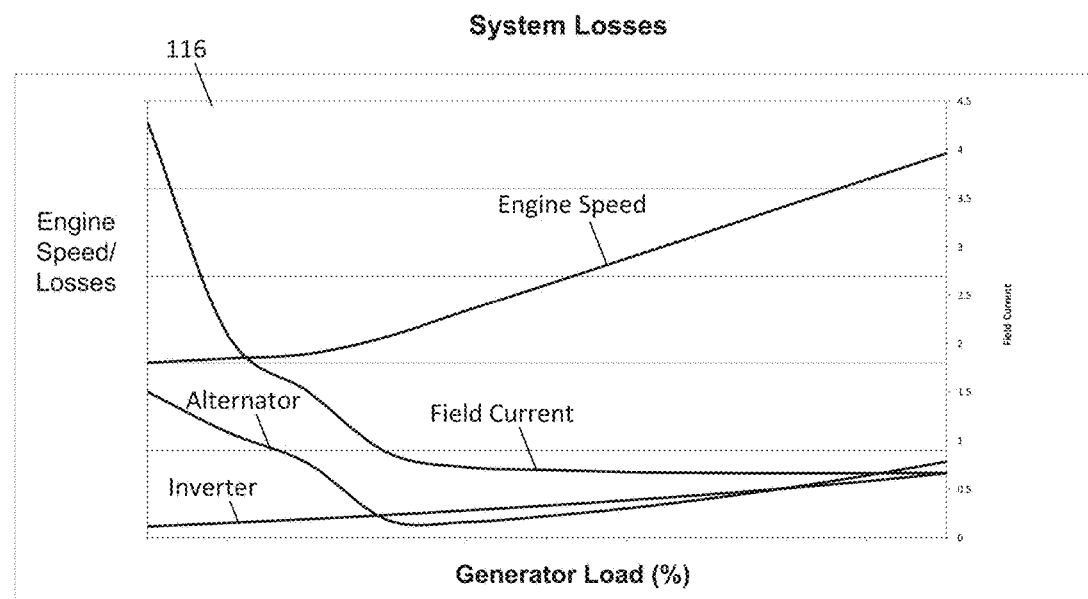
FIG. 12B illustrates an example engine speed versus load curve and system loss curves for a system including a synchronous inverter.

FIG. 12B illustrates a chart 116 for total system losses for an example engine-generator set including losses from the synchronous inverter. The example generator set may be rated to produce 10 kW. The total system losses may be approximated by the sum of the alternator and inverter losses. The total efficiency may be computed as the ratio between the total power provided by the alternator to the total power produced by the engine. The example generator set may have an efficiency approaching 90%.

As illustrated in FIG. 12B, the engine speed increases with increasing generator load. This may allow the engine to provide sufficient power to supply the load and may also improve fuel consumption, sound and air pollutant emissions, and system longevity. The engine speed may remain constant, decrease or increase in a different example. The alternator voltage produced by the system may increase with increasing load, remain constant, or decrease with increasing load. Increasing alternator voltage with increasing load may help to minimize THD, constant voltage with changing load may simplify inverter control, and decreasing voltage with increasing load may help to minimize stress on components in the segmented waveform converter.

Figure 13:
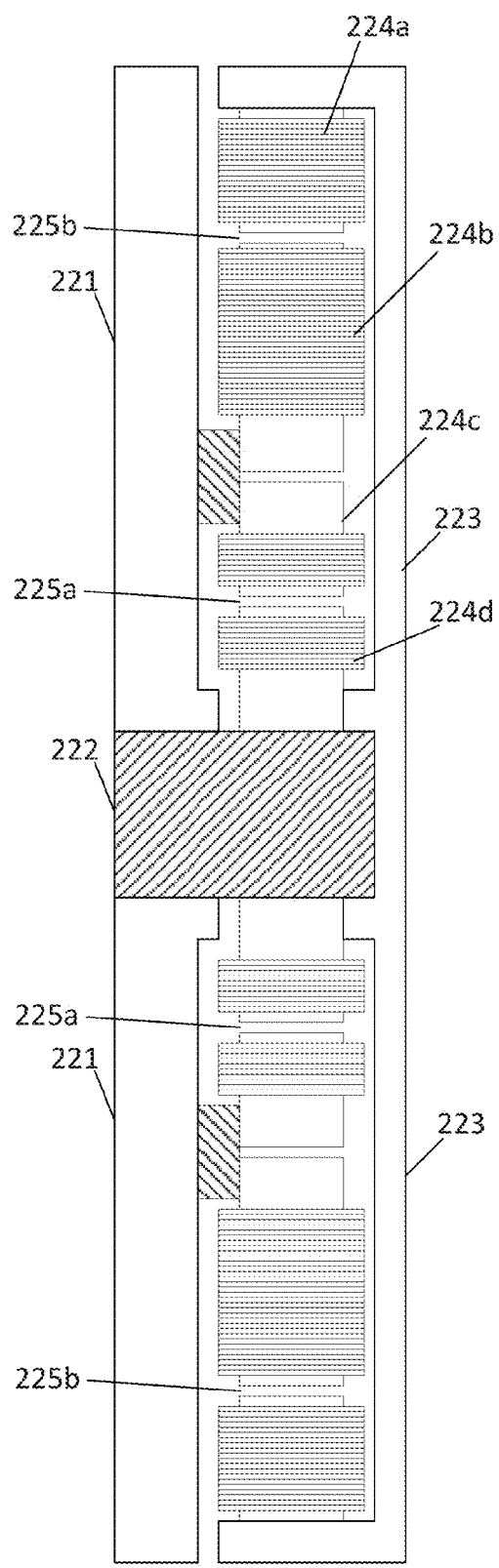
FIG. 13 illustrates an example side view of a dual axis generator.

FIG. 13 illustrates an example wound-field alternator to provide voltage to the synchronous inverter. The example alternator is configured with the exciter field lying in a common plane with the main machine. The example alternator topology may provide additional voltage control and improved speed range over a permanent magnet alternative.

The example alternator topology may provide a similar size profile and efficiency to a permanent magnet alternative. The example alternator topology may be integral to the flywheel of the engine. In this example, the output shaft of the engine may drive a coolant pump, a fan, a fuel pump, another device, or be removed from the shaft casting. The output seal may also be removed from the end-plate casting of the engine.

FIG. 13 illustrates a shaft 222 that supports a rotor frame 223. A stator frame 221 is supported by a fixed member that provides the frame of reference for the rotating rotor. The fixed member may be an engine block or skid or other fixed member. The rotor frame 223 rotates with the shaft. The rotor frame 223 supports a rotor field device and an exciter armature device 224d. Thus, the rotor field device 224a and the exciter armature device 224d may be rigidly mounted together or integrally formed. The stator frame 221 supports an exciter field device 224c, and a main stator device 224b. Thus, the exciter field device 224c and the main stator device 224b are rigidly mounted in the same frame of reference relative to the rotor or may be integrally formed. Either or both of the stator side and the rotor side may be formed of cast iron or steel or laminated silicon steel or other magnetically permeable materials. The outermost component may be designed to act as a shield for electromagnetic interference due to high frequency switching of a power electronic device or devices interior to the outermost component. Also, this may be designed to minimize radiated electromagnetic interference conducted to the alternator from an external power electronic device such as a synchronous inverter.

An exciter air gap 225a is maintained between the exciter field device 224c and the exciter armature device 224d. The exciter field device 224c is energized by a voltage regulator or another power source to generate an exciter magnetic field in the exciter air gap 225a. The exciter armature device 224d is configured to rotate with respect to the exciter field device 224c and impart a first time varying voltage in a set of coils in the exciter armature across the exciter air gap 225a. In one alternative, the exciter field device 224c may include permanent magnets. In another alternative, the exciter field device may include coils or another magnetic field generating device.

A main air gap 225b is maintained between the rotor field device 224a and the main stator device 224b. The main stator device 224b includes a second set of coils. The rotor field device 224a is configured to be energized by the first current in the first set of coils and generate a main magnetic field that imparts a second time varying voltage in the coils of the main stator device 224b across the main air gap 225b.

As illustrated in FIG. 13, the main stator device 224b and the exciter field device 224c lie in on a common plane normal to an axis of rotation of the shaft 222. In a first embodiment, only the main stator device 224b and the exciter field device 224c lie in on the common plane with the rotor field device 24a and the exciter armature device 224d lying in an adjacent plane. In this example, the adjacent plane including the rotor field device 224a and the exciter armature device 224d are axially spaced from the main stator device 224b and the exciter field device 224c. In this embodiment, the main air gap 225b and the exciter air gap 225a lie in adjacent planes or a common plane normal to the shaft. In this first embodiment, magnetic flux travels parallel to the axis of shaft rotation across the main airgap 225b and the exciter airgap 225a. In a another embodiment, the main stator device 224b, the exciter field device 224c, the rotor field device 224a and the exciter armature device 224d lie in the common plane. In this embodiment, the main air gap 225b and the exciter air gap 225a may be concentrically aligned parallel to the axis of the shaft 222 with all or part of the cylindrical exciter air gap 225a contained within the cylindrical main air gap 225b. The exciter armature device 224d is inwardly spaced from the exciter field device 224c, main stator device 224b, and the rotor field device 224a. In other words, the exciter armature device 224d is closer to the shaft 222 than the exciter field device 224c, the main stator device 224b, and the rotor field device 224a. In this second embodiment, magnetic flux travels normal to the axis of shaft rotation across the main airgap 225b and the exciter airgap 225a. Note combinations of the first and second embodiments are possible and contemplated.

Figure 14:
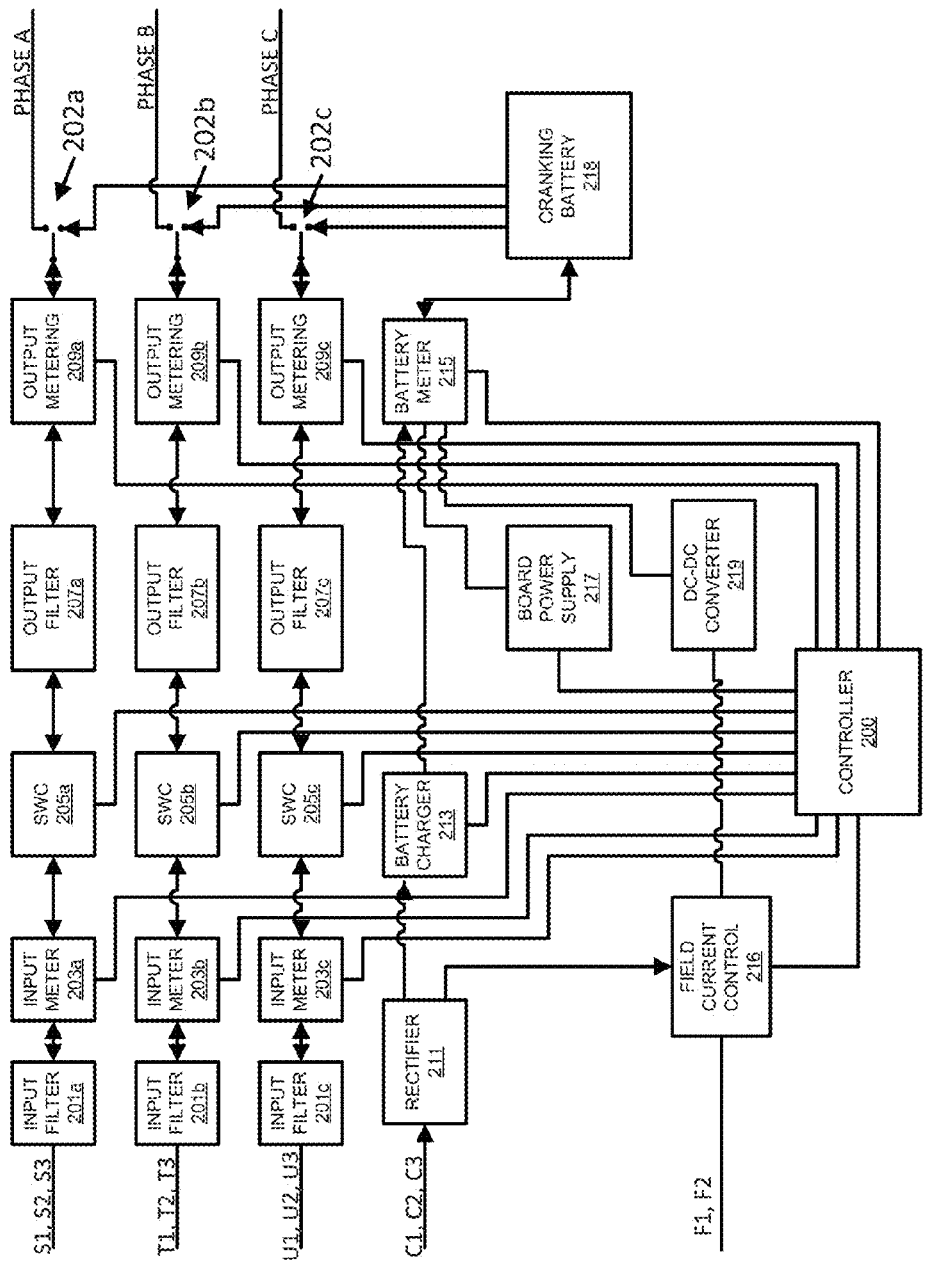
FIG. 14 an example block diagram for an example synchronous inverter system.

FIG. 14 illustrates a block diagram for an example synchronous inverter system. The example synchronous inverter contains three segmented waveform converters 205a, 205b and 205c which may provide the potential to produce three-phase output power through the filter circuits 207a, 207b, and 207c. The segmented waveform converters 205a, 205b and 205c may be supplied with controlled voltages S1, S2, S3, T1, T2, T3, U1, U2 and U3 from the alternator 13 through the input filters 201a, 201b, and 201c. The input voltages S1, S2, S3, T1, T2, T3, U1, U2 and U3 may be adjustable using the field current control device 216. The field current control device 216 may be circuitry or a device configured to receive a command or control signal from the microcontroller 200 and generate a field current in response to the command. The control signal or command for field current control device 216 may be generated by the microcontroller 200. The segmented waveform converters may be controlled based on the input metering 203a, 203b and 203c and the output metering 209a, 209b and 209c. The segmented waveform converters may be controlled by the microcontroller 200.

The cranking battery voltage may be applied to the segmented waveform converters 205a-c through the filters 207a-c by switching output contactors 202a-c. The synchronous inverter may provide engine cranking capability using the segmented waveform converters 205a-c to provide a three-phase AC voltage on the alternator windings. Voltages S1, S2 and S3, T1, T2 and T3 and U1, U2 and U3 may be galvanically isolated from each other. Voltages S1, S2 and S3, T1, T2 and T3 and U1, U2 and U3 may be connected to separate windings in the alternator 13.

The cranking battery 218 may be charged from the inputs C1, C2 and C3 from the alternator 13. The voltage generated on C1, C2 and C3 may be galvanically isolated from the voltage generated on S1, S2, S3, T1, T2, T3, U1, U2, and U3. The voltage provided to C1, C2 and C3 may be generated by a separate winding in the alternator 13. The battery charger 213 may receive a rectified DC voltage from C1, C2 and C3 through the rectifier 211. The battery charger 213 may be controlled based on a fixed sequence. The fixed battery charging sequence may include a bulk charge mode where the voltage is maintained at a higher level until the current drops below a threshold, a float mode where the voltage is maintained at a low enough level to avoid overcharging the battery and an equalize mode where the voltage is increased for a short duration to ensure that the charge in all cells in the battery is equal. The battery charger 213 may be controlled based on the battery metering 215. The battery charger 213 may be controlled by the microcontroller 200. The microcontroller 200 may be powered by the board power supply 217. All components on the synchronous inverter may be switched at the same frequency to minimize electromagnetic interference (EMI) due to aliasing of the signals.

The input filters 210a-c may provide protection to the switches in the segmented waveform converters 205a-c in addition to the snubber circuits provided with the switches. In addition, the input filters 201a-c may provide a bypass path for the current flowing through the inductance of the output windings supplying S1, S2, S3, T1, T2, T3 U1, U2 and U3, allowing the current to be switched as necessary to minimize the THD of the output voltage.

The output filters 207a-c may provide a bypass for the high-frequency switching noise from the segmented waveform converters 205a-c. The microcontroller 200 may determine the voltage on the output and the current in the filter inductor using the output metering 209a, 209b and 209c. The microcontroller 200 may determine the output current from the inverter based on the filter inductor current, the voltage on the filter capacitor, the switching position, past information from a variety of signals, and system parameters such as the capacitance of the filter capacitor and the inductance of the filter inductor. The microcontroller 200 may determine the capacitance value of the filter capacitor over time. The microcontroller 200 may learn the inductance of the filter inductor over time. The output metering 209a, 209b and 209c may include measurement of the output current.

The microcontroller 200 may determine a real and reactive droop characteristic based on the computed or measured output current from each inverter. The real and reactive droop characteristic may be used to operate seamlessly in parallel with a standard generator. The real and reactive droop characteristics may allow for parallel operation with another generator using a synchronous inverter. The output of the generator may be protected outside the four-quadrant capability curve for the generator by opening all switches, closing all switches, some combination thereof, or some other function of microcontroller control.

Figure 15:
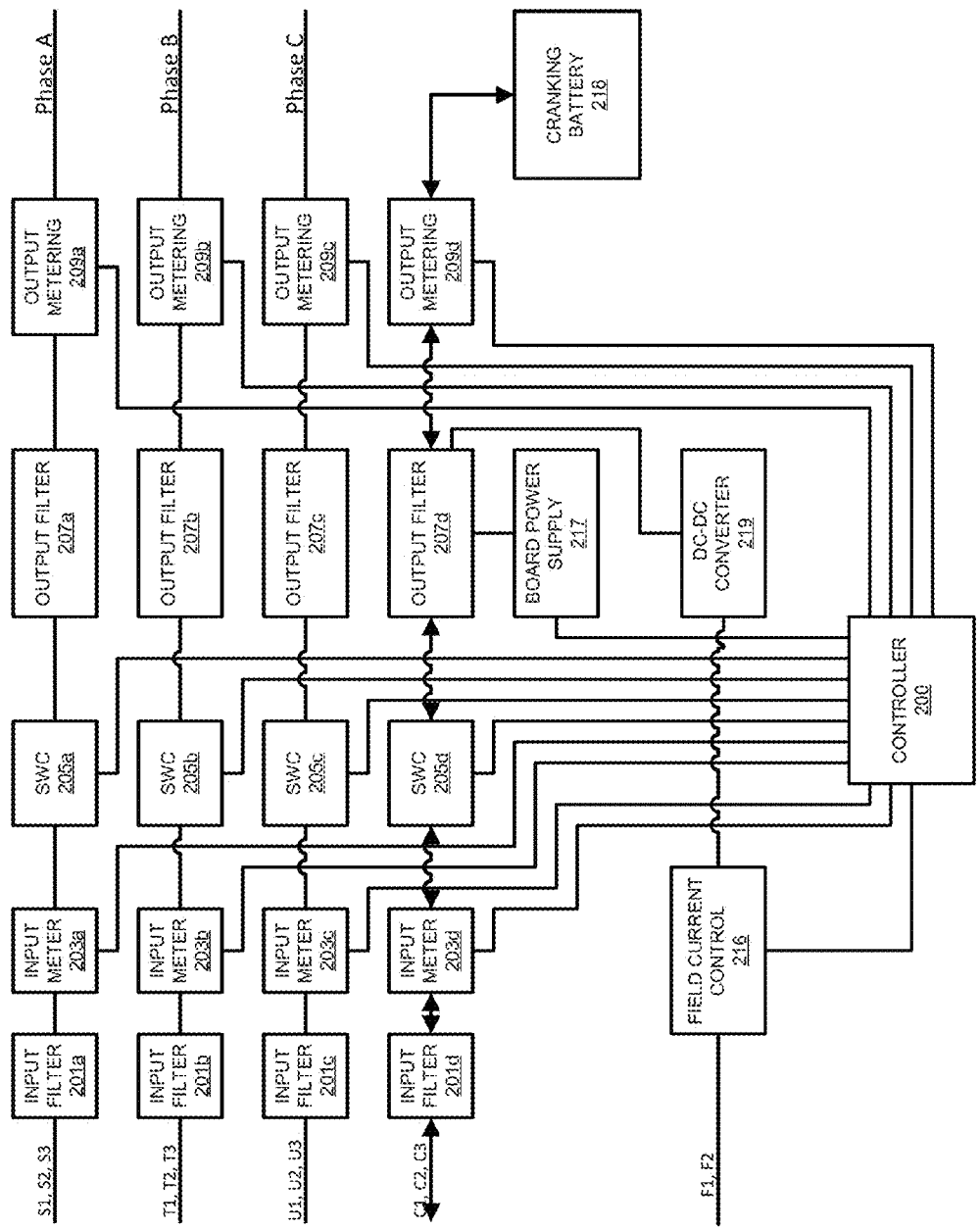
FIG. 15 illustrates a block diagram for another example synchronous inverter system.

FIG. 15 illustrates an example synchronous inverter topology that provides a segmented waveform converter on C1, C2 and C3 to crank the engine. The example is similar to that illustrated in FIG. 14 with the addition of the fourth segmented waveform converter 205d, as well as corresponding input filter 201d, input meter 203d, output filter 207d, and output metering 209d, and the removal of output contactors 202a-c. The additional segmented waveform converter 205d may provide the capability of sourcing AC output voltage from the generator without running the engine if a magnetic flux is applied to the stator without exciting the rotor field. The magnetic flux applied to the stator through windings C1, C2 and C3 may generate a voltage on windings S1, S2, S3, T1, T2, T3, U1, U2, and U3 of the alternator 13. This capability may require different alternator topology such as the ability to disconnect the rotor field from the exciter armature or rectifier and the removal of any damper or induction windings in the rotor.

When cranking battery voltage is applied to segmented waveform converters 205a-c, the synchronous inverter may crank the engine. The crank sequence may be initiated by a digital signal, a communications signal, a state of existing inputs and outputs, or by the presence of cranking battery voltage on the outputs as detected by the output metering 209a, 209b and 209c. Cranking may be controlled by the microcontroller 200. Cranking may be performed by measuring a phase angle of the alternator rotor and moving a magnetic flux to a position at a given angle away from the rotor position. Cranking may be controlled by measuring a speed of the alternator rotor and rotating a magnetic flux at a given difference in speed, also called slip frequency. Cranking may my controlled by providing a fixed rotation frequency in a known direction without feedback from the engine.

Combining the control of input voltage and frequency within the same synchronous inverter that provides the output voltage and frequency may provide various advantages. As an example, the synchronous inverter may provide 139 VAC line to neutral in order to produce 240 VAC line to line in a low-wye configuration or 480 VAC line to line in a high wye configuration. Providing this additional voltage may require increased input voltage from the alternator, but such increased voltage may be unnecessary when providing 120 VAC line to neutral to produce 208 VAC line to line. Including control of the engine speed may allow the synchronous inverter to improve the efficiency of the system by minimizing the engine speed or improve efficiency by providing a frequency that is an integer multiple or simple ratio to the desired output frequency. In addition, control of the engine speed may allow the synchronous inverter to adjust voltage outside the range otherwise provided by adjusting the field current. As an example, the alternator may only be able to produce 90 VAC at 1000 RPM, but 100 VAC may be required to produce 139 VAC line to neutral. In this case, the synchronous inverter may increase the engine speed to 1100 RPM in order to provide 100 VAC.

The alternator field current may be provided by a battery, the AC output of the generator, a dedicated coil on the alternator, or a combination of sources. The synchronous inverter may control the field current using a half bridge supply or a full bridge supply. The half bridge supply may be capable of providing positive voltage to the field and allowing it to decay naturally. The full bridge supply may be able to provide a negative and positive voltage to the field, increasing and decreasing the current more quickly. The half-bridge driver may be provided with battery voltage or with a higher voltage generated from the battery voltage or another source. The full-bridge driver may be provided with battery voltage or with a higher voltage generated from the battery voltage or another source.

Combining engine starting capability into the synchronous inverter may allow the total system complexity to be reduced by utilizing the same components for both operations and eliminating the need for a separate starting motor. Starting using the alternator may provide quieter starting operation by removing the power transfer through spur gears on the starter motor and flywheel, lower current draw on the cranking battery by improved efficiency, reduced wear on the system due to minimized side loading while cranking, higher cranking speed due to lower loss connection, decreased package size and lower cost due to removal of the dedicated starting motor, and galvanic isolation due to the use of separate windings in the alternator from the battery charging windings.

Integrating battery charging in the inverter may decrease total package size by eliminating the battery charging alternator, improve reliability of the system by removing the drive mechanism for the battery charging alternator, reduce system complexity by eliminating one controller, provide galvanic isolation between the battery and the generator outputs by using a separate winding, and provide a high-voltage supply for the field from the battery charging windings.

The alternator 13 may have inductance in the stator which may cause voltage spikes on the input to the segmented waveform converter. The voltage spikes that are generated by the inductance may be minimized by the input filter, by control algorithms for the segmented waveform converters, and by control of the alternator field and engine speed.

The output of the synchronous inverter may be used to operate a motor, similar to a variable frequency drive operation. The segmented waveform converter topology may allow for bi-directional power transfer from the motor, allowing regenerative breaking from the motors. If multiple motors are being driven by a given generator, power may be transferred from one motor to the other.

The alternator may have slightly varying characteristics with temperature and manufacturing tolerance stackup. The microcontroller in the inverter may adapt to the changing characteristics to allow for consistent operation between all products utilizing the synchronous inverter configuration. The engine performance characteristics may also vary with atmospheric conditions, manufacturing tolerances, fuel types and maintenance items. The microcontroller may be able to adapt to the engine characteristics in order to provide expected power quality over the entire load range.

The microcontroller 200 may control the output voltage using closed-loop feedback from the output metering. The microcontroller 200 may control the output voltage as a function of the input voltage. The voltage may be controlled with a combination feedback and feed-forward system, with feed-forward tables that may provide adaptive learning capability.

In a short circuit condition, the microcontroller 200 may control the output current using closed loop feedback from the output metering. The output filter inductor may limit the rise rate of the output current, potentially protecting the switches from damage when sourcing into a short-circuit condition. The short circuit current may be controlled by the switches in the segmented waveform converters, the excitation level in the alternator, or a combination of the two. In addition the output current may be controlled in a scenario where the inverter is connected to a motor in order to limit motor torque.

In cases were multiple inverters are used, the inverters may communicate a synchronizing signal in order to match phase angle across different inverters. The synchronizing signal may be provided over communications, a digital signal, and analog signal, or by observation of the input voltage from the alternator, among other techniques. The sync signal may provide loading information, target information, control mode, connection information, etc. If multiple inverters are used, only one inverter may have control of the field current. That said, the other inverter(s) in the system may want to adjust their supply voltage, so the inverters may communicate a desired input voltage over the communications network, a digital signal or an analog signal.

If multiple inverters are used in parallel, the inverters may need to share loading information in order to equalize the load on each inverter. This may be provided by communications, digital signals, analog signals, or simple droop handling.

The output voltage from different inverters may be tied in parallel with other inverters, or even multiple output stages from a single inverter may be connected together. The configuration of the output of the inverter may be user-adjustable or it may automatically detect that outputs are connected together in order to determine how to control the voltage. Automatic connection detection could involve a specific power up sequence where one inverter stage observes voltage on the input, it could involve current monitoring for abnormalities, it could involve transmission of a special signal on the outputs to be received by another device, or another technique.

Figure 16:
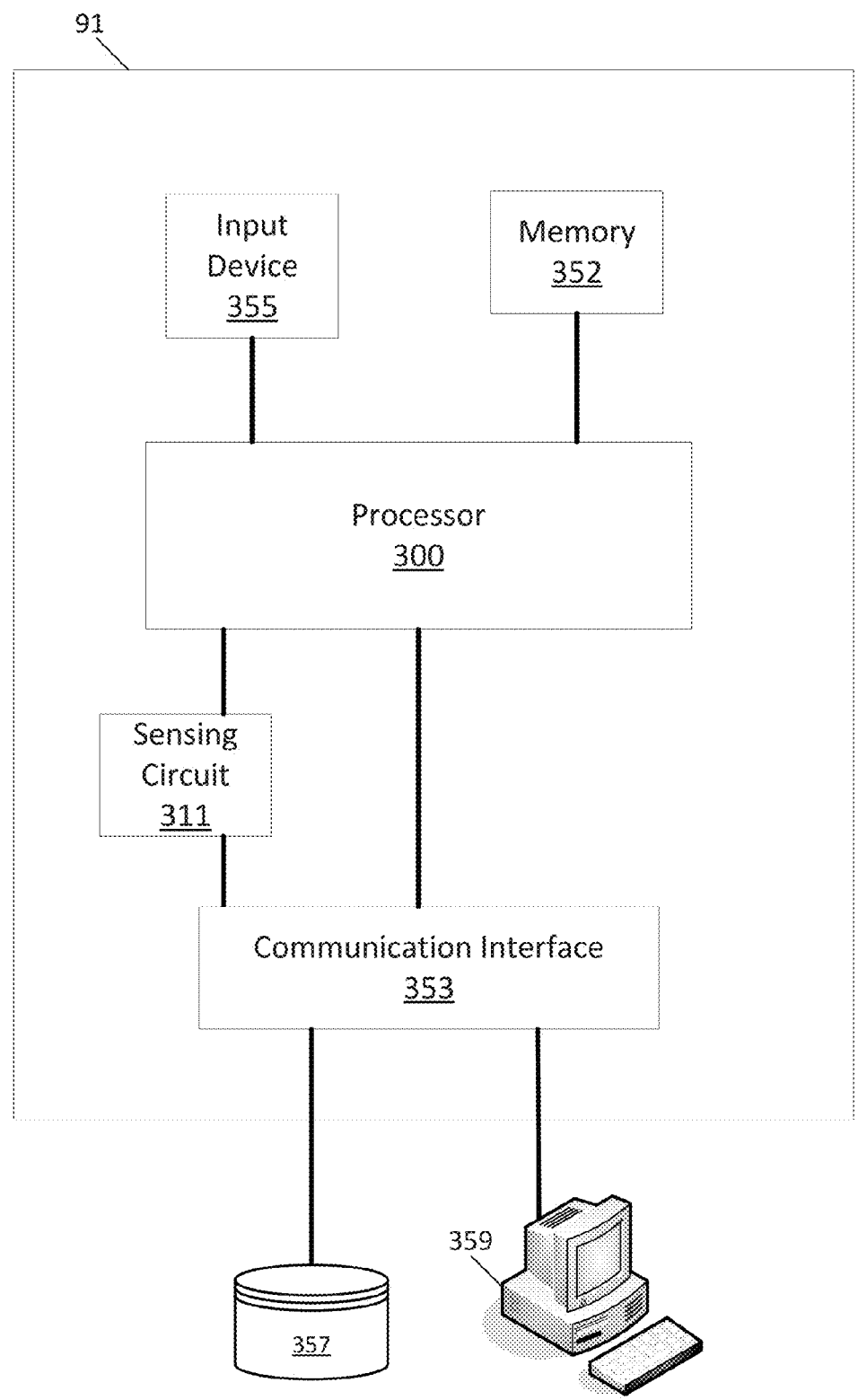
FIG. 16 illustrates an example controller.
Figure 17:
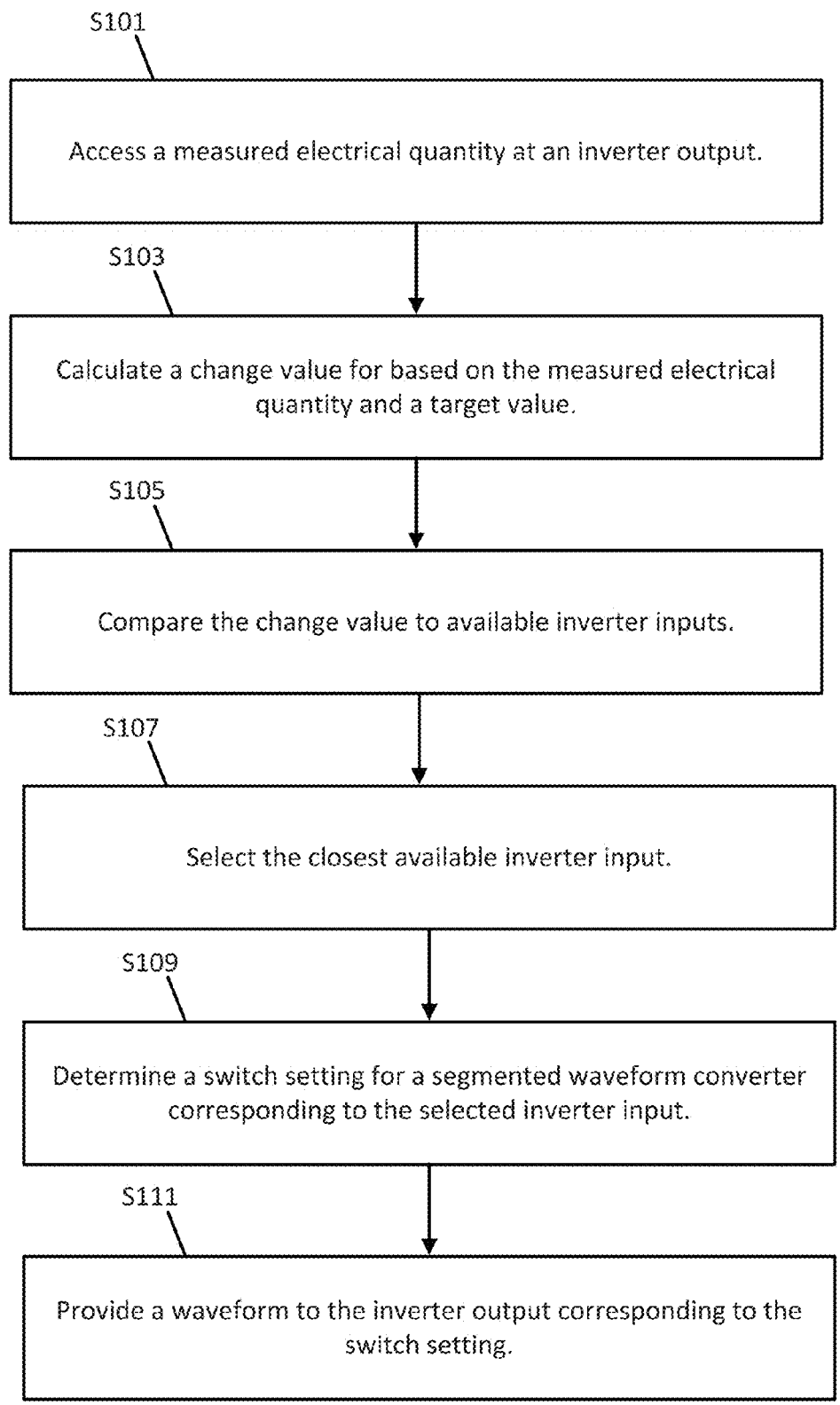
FIG. 17 illustrates a flow chart for the controller of FIG. 15.

FIG. 16 illustrates an example generator controller 91. The generator controller 91 may include a processor 300, a memory 352, and a communication interface 353. The generator controller 91 may be connected to a workstation 359 or another external device (e.g., control panel) and/or a database 357 for receiving user inputs, system characteristics, and any of the values described herein. Optionally, the generator controller 91 may include an input device 355 and/or a sensing circuit 311. The sensing circuit 311 receives sensor measurements from as described above (e.g., alternator output SWC output). Additional, different, or fewer components may be included. The processor 300 is configured to perform instructions stored in memory 352 for executing the algorithms described herein. The processor 300 may be compatible with a variety of engine and alternator combination and may identify an engine type, make, or model, and may look up system characteristics, settings, or profiles based on the identified engine type, make, or model. FIG. 17 illustrates a flow chart for the operation of the generator controller of FIG. 16. Additional, different of fewer acts may be included.

At act S101, the processor 300 accesses from memory 352 or from real time measurement (e.g., sensing circuit 311), a measured electrical quantity at an inverter output. The inverter output may be an actual power signal applied to a load under a specification. The specification may be a target value for a sinusoidal signal at time intervals. Alternatively, the target value may specify an amplitude range or root mean squared range for the inverter output. The target value may specify a variance or quality (e.g., THD) level for the inverter output.

At act S103, the processor 300 calculates a change value for based on the measured electrical quantity and the target value. In other words, the processor 300 determines the difference between the target value and the actual value of the inverter output. The change value may be either positive or negative.

At act S105, the processor 300 compares the change value to available inverter inputs. One set of available inverter inputs is shown on each row of Table 1 above. The available inverter inputs depend on either the expected or actual values of outputs of the alternator. For example, in a three phase alternator having outputs A, B, and C, the set of outputs may be A, B, C, A-B, B-C, A-C, B-A, C-B, and C-A. Each of the set of outputs has a value, which changes on each time interval (e.g., sampling interval).

At act S107, the processor 300 selects a closest available inverter input combination (alternator output) based on the comparison. In one embodiment, the closest available inverter input combination is used without modification. In another embodiment, the closest available inverter input combination is modified to more closely achieve the target value using PWM.

At act S109, the processor determines a switch setting for a switch array of a segmented waveform converted corresponding to the selected inverter input combination. The switch setting is a digital signal or series of bits that describes which of the switches of the segmented waveform converter should be turned on and off in order to provide the selected inverter input combination.

At act S111, the processor 300 provides a waveform to the inverter output corresponding to the switch setting. In one example, the processor 300 calculates a difference between the closest available inverter input combination and the target value, and modifies the waveform using a pulse width modulated signal with a duty cycle that is based on the difference between the closest available inverter input and the target value.

Figure 18:
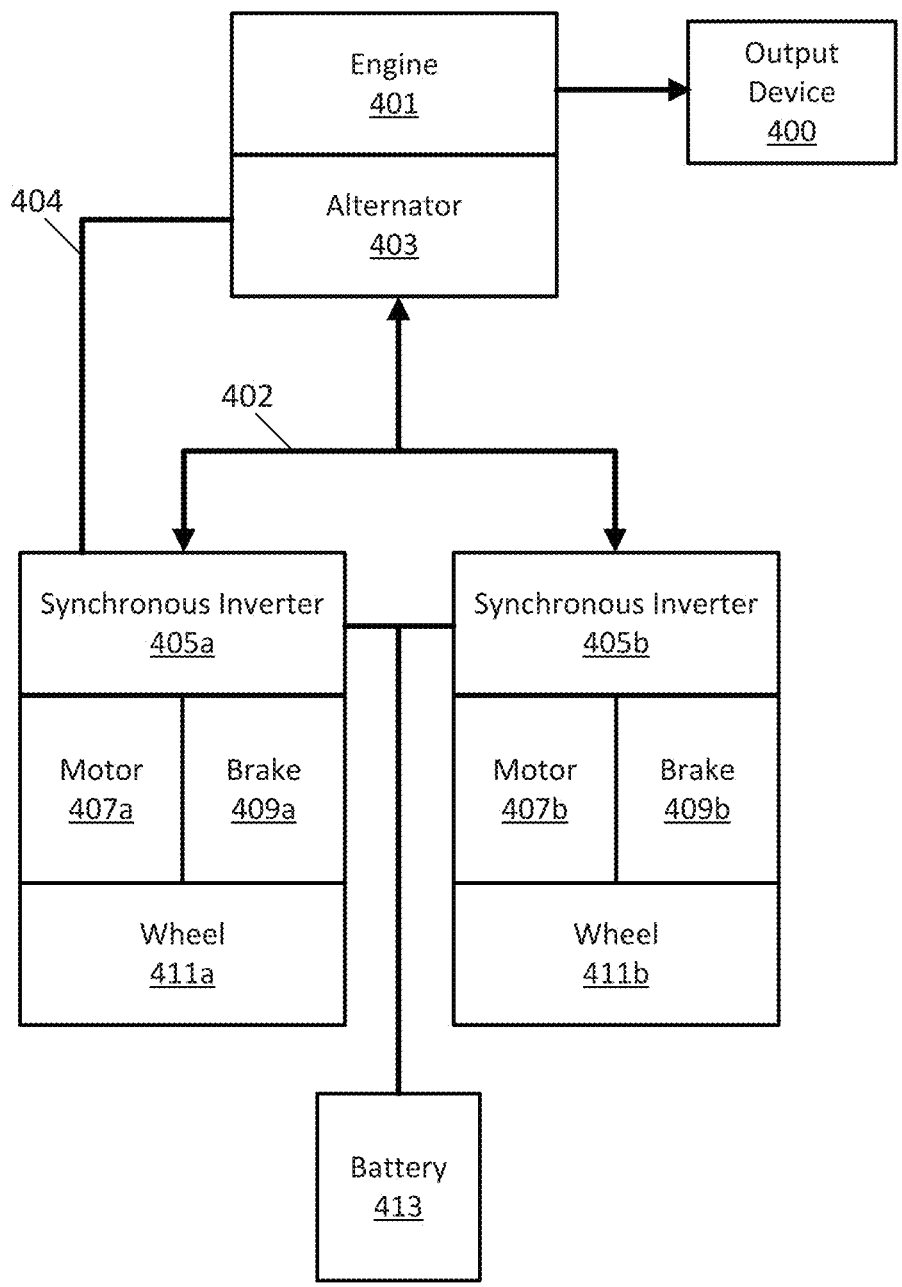
FIG. 18 illustrates an example alternator and two synchronous inverters.

FIG. 18 illustrates an example system including an engine 401, an alternator 403, two synchronous inverters or segmented waveform converter 405a and 405b, an output device 400, and a battery 413. One of the synchronous inverters 405a is coupled with a motor 407a, a brake 409a, and a wheel 411a, and the other of the synchronous inverters 405b is coupled with a motor 407b, a brake 409b, and a wheel 411b. Either or both of motors 407a and 407b are examples of an output drive mechanism for the system. The motors 407a and 407b may be referred to individually and interchangeably as motor 407, the brakes 409a and 409b may be referred to individually and interchangeably as brake 409, and the wheels 411a and 411b may be referred to individually and interchangeably as wheel 411. The engine 401 may directly drive the output device 400. Additional, different, or fewer components may be included.

The alternator 403 is mechanically coupled with the engine 401. As described in earlier embodiments, the rotation of an output shaft of the engine 401 rotates an exciter portion and a main field portion of the alternator 403. The exciter portion includes an exciter armature for generating a field current to induce a time varying magnetic flux in the armature windings, generating voltage. The induced voltage in the windings of the exciter armature is connected to the main field portion of generator. The corresponding field current of the output of the exciter provides a magnetic field in rotor field of the main field portion of the generator. As the main field portion of the alternator is rotated relative to the stator, a magnetic flux is passed through and across the alternator stator windings producing an alternator output signal in bus 402. Alternate forms of field control are included herein as well (e.g. brushes and slip rings, flux weakening coils, direct axis current injection).

The alternator output signal may include multiple components that are selectively controlled by the synchronous inverters 405a and 405b. The derivation of the output of the synchronous inverters 405a and 405b, or the conversion of the alternator output signal to the output of the synchronous inverters 405a and 405b may be performed by generator controller 50, generator controller 91, or microcontroller 200 (any one referred to individually as "controller") in the examples described previously. The controller may consult a lookup table or a configuration value that is specifically tailored to a particular type of motor application of the motor, or feedback based on the current operation of the motor. The controller may determine switch settings for multiple settings that set the output of the synchronous invertors as combination of the multiple components of the alternator output signal. One of the components may be passed or multiple components may be added or subtracted. The controller may apply the switch settings to at least one segmented waveform converter including multiple switches connected between the alternator 403 and the output drive mechanism (e.g., motors 407a and/or 407b).

The motors 407a and 407b may be AC motors comprising a stationary stator including coils supplied with alternating current by the synchronous inverters 405a and 405b (referred to individually or as synchronous inverter 405). The coils induce a rotating magnetic field that causes a rotor and attached to an output shaft of the AC motor to rotate. The stator and rotor may be housed in a casing, and the stator may be mechanically coupled to a casing. The output shaft may be rotatably mounted to the casing using a bearing.

The output of the synchronous inverter 405 may include a drive frequency that causes the output shaft of the motor to rotate at a particular speed. In one example, the speed of the output shaft in rotations per second is the same as the drive frequency in cycles per second or related by a predetermined ratio. In other examples, as with induction motors, the drive frequency and shaft speed may not be related by a predetermined ratio. The predetermined ratio may depend on the numbers of poles in the rotor and/or the number of poles of the stator.

The output of the synchronous inverter 405 may be selected, via switch settings, to cause the speed of the output shaft to change in time. The changes in the speed of the output shaft may be within a time interval that is less than a single rotation of the output shaft or even less than a cycle of the output of the synchronous inverter 405, which may be referred to as electrical subcycle torque control. Electrical subcycle torque control applies in torque changes to the output shaft in less than an electrical cycle of the output of the synchronous inverter 405. Electrical subcycle torque control may be on the order of 1 to tens of milliseconds. In this way, very quick changes may be applied to the output shaft. The shaft may rotate at multiple speeds within just a few rotations or even a single rotation.

The controller may select the output of the synchronous inverter 405 based on a feedback signal for the rotation of the output shaft, an input signal, or both. The input signal may be from an input device for setting the speed of the rotor. The feedback signal may be generated by a sensor such as a rotation sensor. The rotation sensor may magnetically, optically or mechanically measure the rotation of the output shaft. Thus, the feedback signal may be indicative of the speed of the output shaft.

Also, the feedback signal could be derived from the output of the synchronous inverter 405. The controller may calculate shaft output characteristics such as speed or torque as a function of the synchronous inverter output voltage or current. The controller may compare the feedback signal to the input signal. When the input signal indicates a speed or torque for the output shaft that is greater than a speed or torque target, the controller decreases the frequency, voltage, or current output of the synchronous inverter 405. Likewise, when the input signal indicates the speed for the output shaft that is less than the target, the controller increases the frequency, voltage, or current output of the synchronous inverter 405.

Through the synchronous inverter 405, the speed of engine 401 and alternator 403 may be independent of the frequency applied to the motors 407 and accordingly, independent of the speed of the wheels 411. Therefore, the engine 401 and alternator 403 may be controlled only to optimize the output device 400 (e.g., speed of the output device) and the synchronous inverters 405 control the speed of the motors 407. Only the alternator 403 power or voltage output is controlled to sufficiently supply the synchronous inverters.

The speed of the engine 401 and the output of the synchronous inverters 405 may be independent within an operating range of the engine 401. Through the operating range, the output device 400 speed may be adjusted without interrupting the speed applied to the motors 407 and the wheels 411. In other words, when the engine 401 is operated within a predetermined power range or rotational speed range, the speed of wheels 411 may be operating in any predetermined speed range in which the power requirements are met by the predetermined power range of the engine 401.

The battery 413 is connected to the synchronous inverter 405 to act as a source and sink of power. The synchronous inverter 405 may be configured to charge the battery 413 or utilize the battery 413 as a source of power to crank the engine 401 via the alternator 403. The synchronous inverter 405 may also use the battery 413 in a limited capacity to deliver power to the motor 407 or actuate the brake 409. The system is capable of transferring power between components without use of the battery. The battery capacity may not be sufficient to provide full power to all components.

Power may also travel in the reverse direction, from the motor 407 to the synchronous inverter 405. For example, a reverse torque may be applied to motor 407a, which induces a reverse current though the synchronous inverter 405a to the alternator 403. Through the power bus 402, the reverse current may contribute to the power drawn by the synchronous inverter 405b and applied to motor 407b.

In one example, the system illustrated in FIG. 18 is applied to a vehicle such as a forklift, a loader, a golf cart, or a lawnmower such as a zero turn radius lawnmower. A zero turn radius lawnmower may be a lawnmower in which at least two wheels are individually controlled. While the term "lawnmower" may be used in some of the following embodiments, substitutes may be made for other types of vehicles. Aside from the deck and mower apparatus, the drive systems and synchronous inventors may be applied to other types of vehicles. Thus, each wheel 411a and 411b are individually controlled by the outputs of the synchronous inverters 405a and 405b. A first segmented waveform converter 405a is associated with a first wheel 411a of a vehicle and a second segmented waveform converter 405b is associated with a second wheel 411b of the vehicle. The first wheel 411a and/or the second wheel 411b is coupled to a drive train, which is the output drive mechanism (primary drive system), to propel the vehicle. In alternative embodiments, only a single wheel is controlled, multiple wheels are connected to a single motor, or three or more motors for multiple wheels are controlled.

Advantages of electrical control using the synchronous waveform converters may be realized over hydraulic or other mechanical systems. For example, in addition to the increased granularity of torque control, electrical drive is more efficient than hydraulic systems. The efficiency improvements save in fuel costs and a smaller engine may be selected. Electrical systems have other advantages over hydraulic systems including the elimination of hydraulic fluid spills, which may damage equipment or vegetation.

The lawnmower may also include a mowing system. The mowing system includes one or more blades configured to cut grass or other vegetation. The mowing system may correspond to output device 400. A shaft, belt or other drive train may mechanically connect the engine 401 to the output device 400. The output device 400 and the engine 401 may respond to the power requirements of cutting depending on the specific local requirements (e.g., thickness of the vegetation, water content, or other factors).

In operation, when the vehicle is traveling generally in a straight line the speed of the wheels is the same. However, when making turns, the inner wheel with respect to the curve or turn experiences a lower average speed or number of revolutions than the outer wheel with respect to the curve or turn. For the slower wheel to reduce speed, a brake 409 may be applied to the wheel 411. In addition, a power transfer (e.g., negative torque, reverse torque, rear facing torque) may be made from the inner wheel to the outer wheel. The kinetic energy of the rotating mass of the inner wheel is consumed to deliver power to the outer wheel, thereby effecting a braking force on the inner wheel while effecting an accelerating force on the outer wheel without drawing power from or as supplement to power delivered by the engine. As an example, the kinetic energy of the rotating mass of the inner wheel 411a is used to drive the motor 407a to generate power, controlled by synchronous inverters 405a, which is delivered via bus 402 to synchronous inverters 405b for drive of the outer wheel 411b. In a further embodiment, the power delivered by the inner wheel synchronous inverters 405a may be used to charge battery 413 or battery 505.

In one example, the controller is configured to generate and provide a magnetic field control signal to the controlled field alternator 403. The magnetic field control may adjust the field current. Alternatively, an armature reaction technique such as adjustment of current on flux weakening coils or a mechanical technique such as changing a linkage path of the magnetic path may be used to modify the magnetic flux or the magnetic field control signal. In other examples, a DC output from at least one of the segmented waveform converter may be applied to the controlled field alternator 403 as a field current. The DC output may be generated by circuit 35 described in other embodiments. The magnetic field control may be provided by one or more of the synchronous inverter DC outputs. Alternatively, the magnetic field control may be provided by another device with or without a signal from the synchronous inverters 405.

The DC output of the other synchronous inverter may be applied to a release mechanism for the brakes 409. The primary function of the brakes is to slow the wheels 411 when activated. However, the brakes 409 may include a safety mechanism (e.g., a spring) that defaults to biasing the brakes 409 to stop the vehicle. The safety mechanism may be released by an actuator (e.g., solenoid) when so signaled by the DC output of the synchronous inverter. This causes the brakes to be applied when the engine 401 or the synchronous inverter is off and to be released when the engine 401 or the synchronous inverter is running and applying the DC output.

The DC output of the other synchronous inverter may be applied to another purpose such as a control panel, safety mechanism, or status indicator. The control panel may include an interface for setting the output of the synchronous inverter. The safety mechanism may be a circuit to measure an electrical quantity of the synchronous inverter and compare to a threshold and identify an error with the threshold is exceeded. The status indicator may include one or more lights or displays that indicates the synchronous inverter. In another embodiment, the DC output of the other synchronous inverter may be used to power an accessory outlet or lighting of a configurable AC or DC nature.

Figure 19:
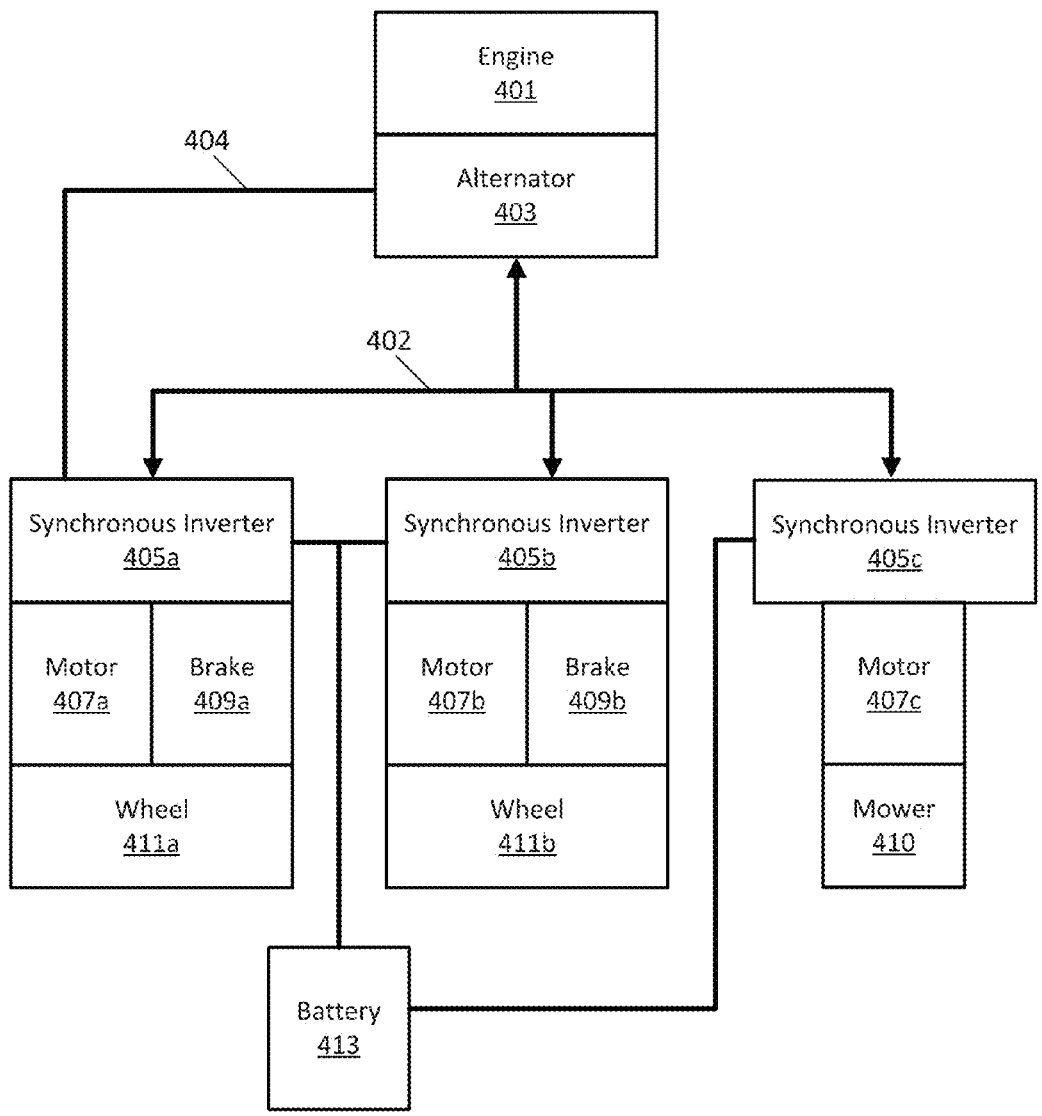
FIG. 19 illustrates an example alternator and three synchronous inverters.

FIG. 19 illustrates an example alternator and three synchronous inverters for a lawnmower. Similar components illustrated previously are consistent with FIG. 19. Additional, different or fewer components may be included.

FIG. 19 includes a third synchronous inverter 405c that controls a third motor 407c for the mower 410 (e.g., mower deck). Thus, the output drive mechanism (secondary drive system) coupled with the synchronous inverter 405c drives the mower 410. In this embodiment, the engine 401 only drives the alternator 403. Control of engine speed and torque may be made solely on total power requirements of the system, which may be balanced and allocated by the synchronous inverters 405. In other words, cutting speed for the mower 410 is independent of engine speed and the speed of each of the wheels 411 is independent of the engine speed. As well, the cutting speed for the mower 410 may be independent of the speed of each of the wheels 411 (e.g., wheel 411*a* is independent of mower 410, wheel 411*b* is independent of mower 410, and wheel 411*a* is independent of wheel 411*b*). In the embodiment of FIG. 19, any of the DC outputs of the synchronous inverters 405 may supply the field current to the alternator 403. In one example, the magnetic field control is provided by synchronous inverter 405*c* that drives the mower 410.

Figure 20:
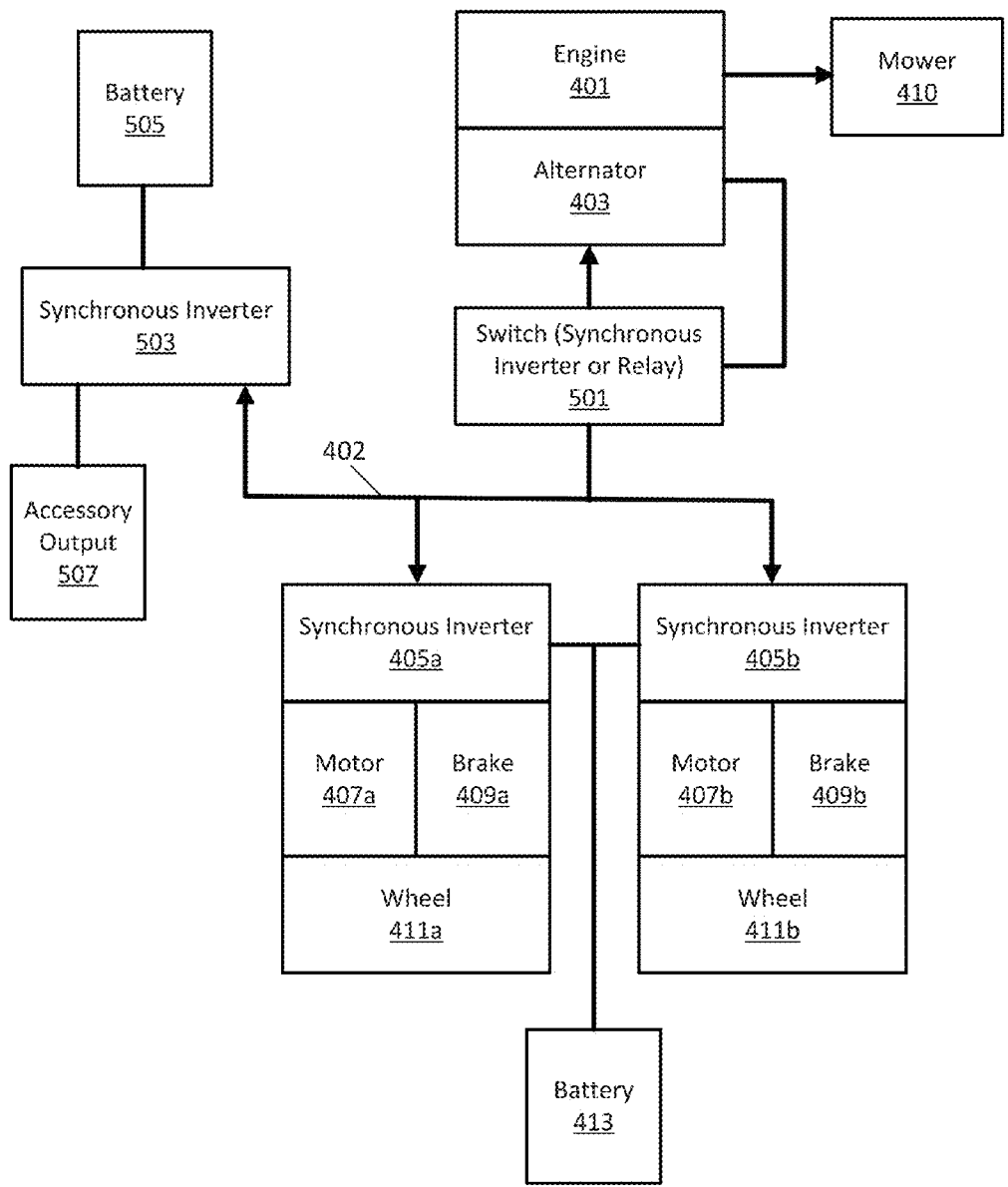
FIG. 20 illustrates an example lawnmower implementing a synchronous inverter for battery charging.

FIG. 20 illustrates an example lawnmower implementing a synchronous inverter for battery charging. The engine 401 in the embodiment of FIG. 20 directly drives the mower 410. Similar components illustrated previously are consistent with FIG. 20. Additional, different or fewer components may be included.

A synchronous inverter 503 (supplemental segmented waveform converter), which may also be configured and operated by the controller, applied power from battery 505 to the power bus 402, and accordingly, to synchronous inverters 405 and the motors 407. Power may also flow in the reverse direction. That is, when braking or otherwise slowing one of the wheels 411, the motor 407 may act as a generator and provide power back to synchronous inverter 503 to charge the battery 505. Therefore, either of synchronous inverters 405*a* and 405*b* may charge the battery 505.

A switch 501, which may be implemented as a relay or an addition synchronous inverter, connects and disconnects the alternator 403 to the power bus 402. The switch 501 may also be operated by the controller.

At accessory output 507 provided by the synchronous inverter 503 may power other electrical systems or accessories of the lawnmower. The other accessories may include headlights, gauge panels, turn signals, horns, radios, or other devices.

Figure 21:
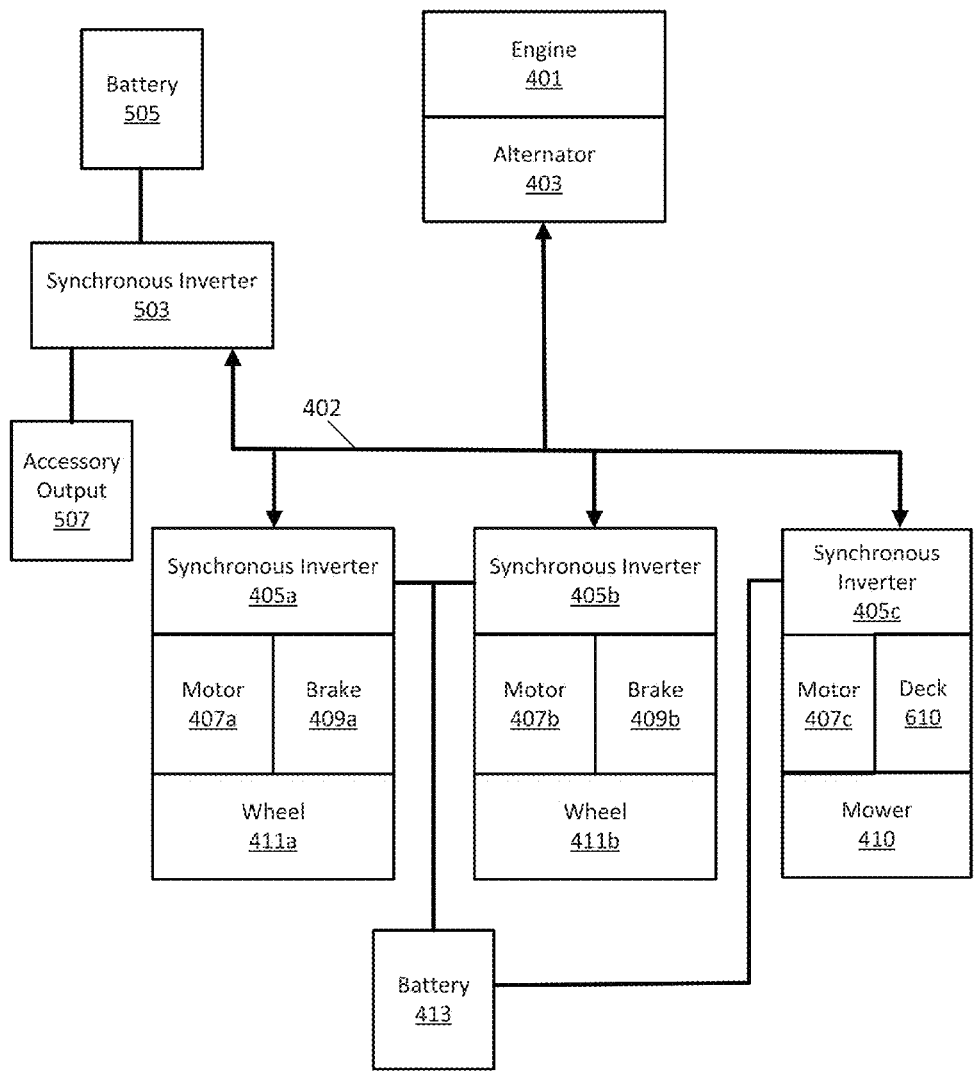
FIG. 21 illustrates an example lawnmower implementing three synchronous inverters in addition to a synchronous inverter for battery charging.

FIG. 21 illustrates an example lawnmower implementing three synchronous inverters in addition to a synchronous inverter for battery charging. Similar components illustrated previously are consistent with FIG. 21. Additional, different or fewer components may be included.

In this embodiment, synchronous inverter 405*c* provides power to motor 407*c*, which drives mower 410. In addition, the DC output of the synchronous inverter 405*c* may set the height of deck 610 of the mower 410. The controller may receive a user input for deck height (e.g., distances from the ground) and in response, control the switch settings of synchronous inverter 405*c* to raise or lower the deck 610 using another motor or drive mechanism.

Figure 22:
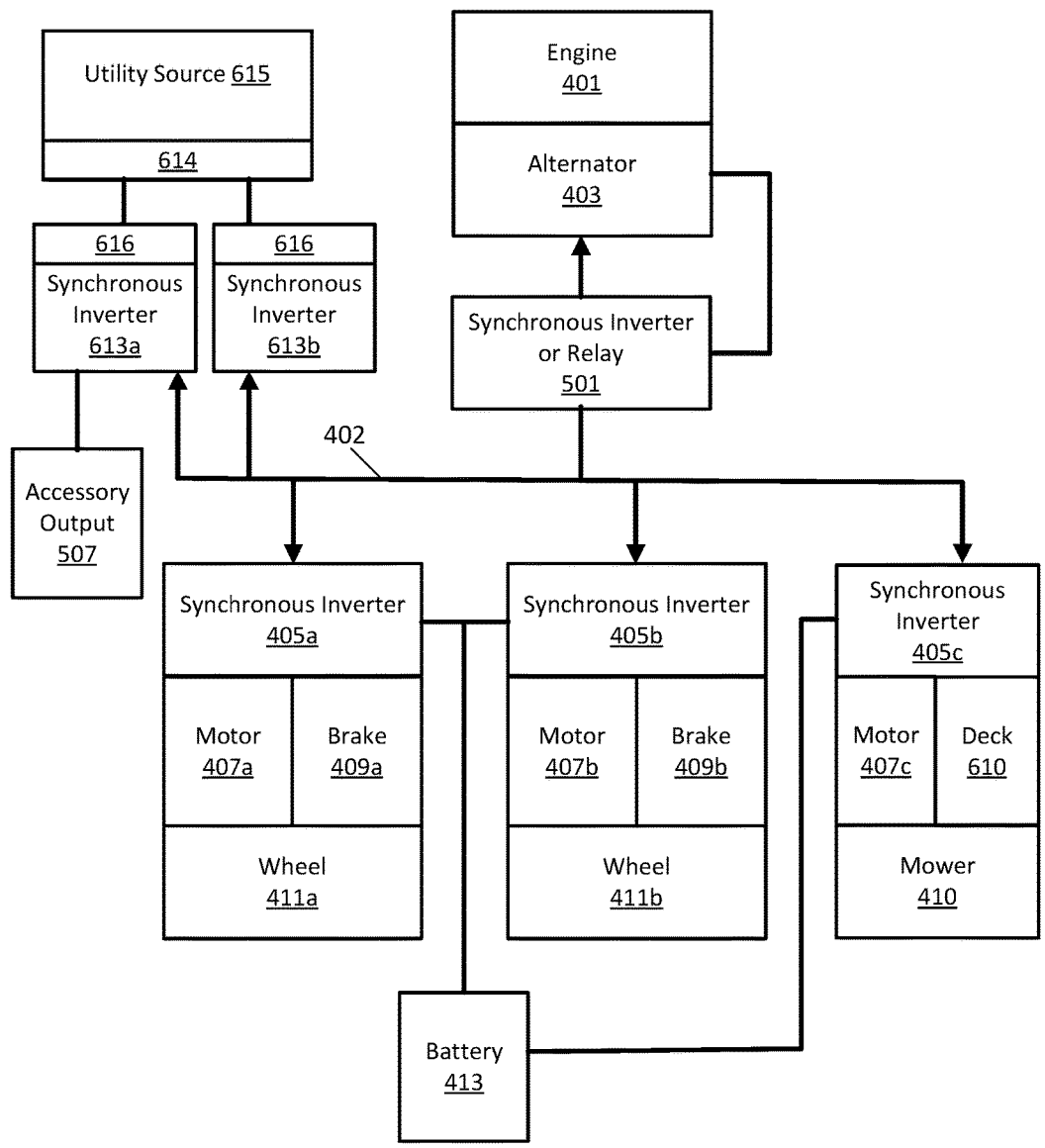
FIG. 22 illustrates an example lawnmower implementing three synchronous inverters and a utility source.

FIG. 22 illustrates an example lawnmower implementing three synchronous inverters and a utility source. Similar components illustrated previously are consistent with FIG. 22. Additional, different or fewer components may be included.

The embodiment of FIG. 22 includes a utility source that may also provide power to the power bus 402 through synchronous inverters 613*a* and 613*b*. Any number of synchronous inverters may be coupled to the utility source 615. The utility may be an AC source provided to the lawnmower through a variety of delivery mechanisms. In one example, an electrical cord may extend to the vehicle from the utility (e.g., electrical outlet). Alternatively, an inductive or other wireless coupling may provide the utility source 615. For example, one or more inductive coils 614 may be buried or otherwise placed beneath a driving surface. The inductive coils 614 induce a voltage on one or more receiving coils 616 in the lawnmower and provide power to the synchronous inverters 613*a* and 613*b*, which are configured and operated by the controller.

Figure 23:
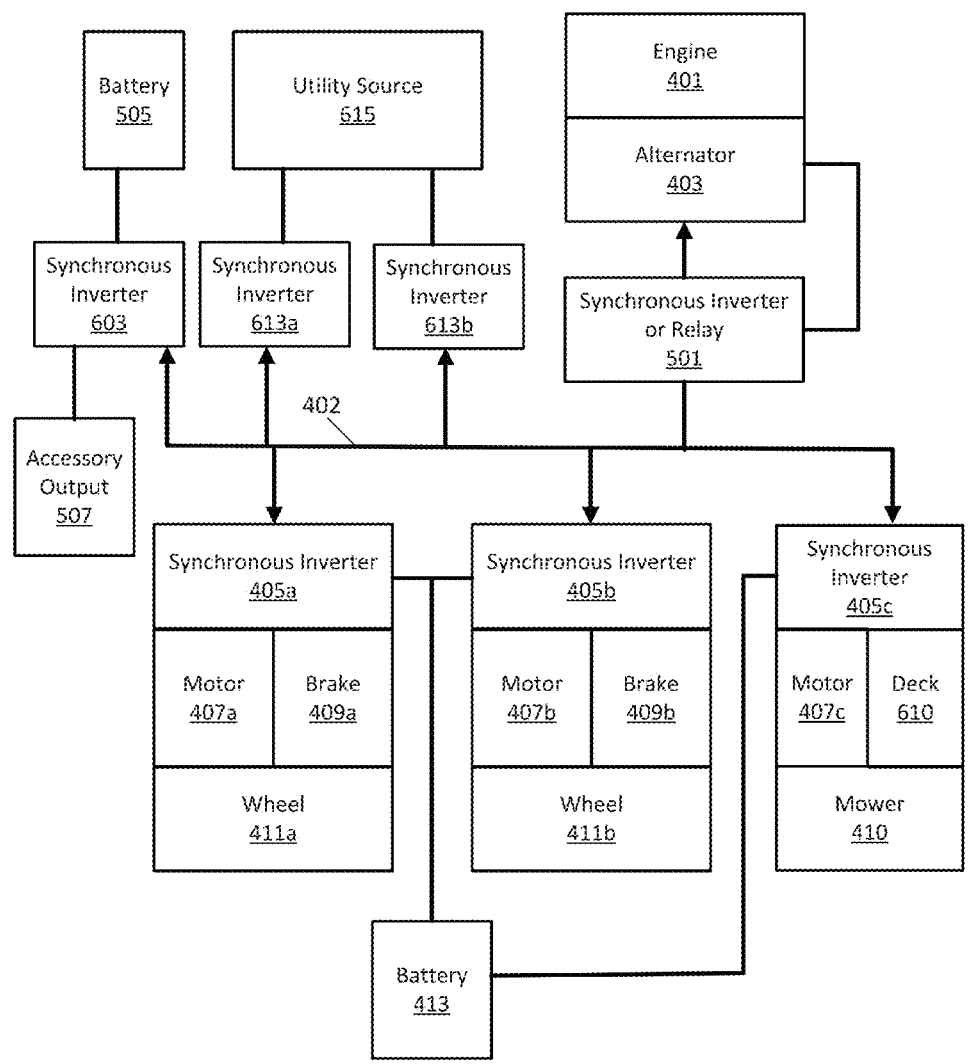
FIG. 23 illustrates an example lawnmower implementing synchronous inverters and supplemental synchronous inverters for battery charging and a utility source.

FIG. 23 illustrates an example lawnmower implementing synchronous inverters for the drive of the motion of the lawnmower, mowing of the lawnmower, and supplemental synchronous inverters for charging the battery 505 and the utility source 615. Similar components illustrated previously are consistent with FIG. 23. Additional, different or fewer components may be included.

Depending on the circumstances or current settings, the utility source 615, the battery 505 and/or the alternator 403 may provide power to the wheels 411*a* and 411*b* through synchronous inverters 405*a* and 405*b* and/or the mower 410 and/or deck 610 through the synchronous inverter 405*c*. Also depending on the circumstances or current settings, the utility source 615 and/or the alternator 403 may charge the battery 505 through the synchronous inverter 603.

Figure 24:
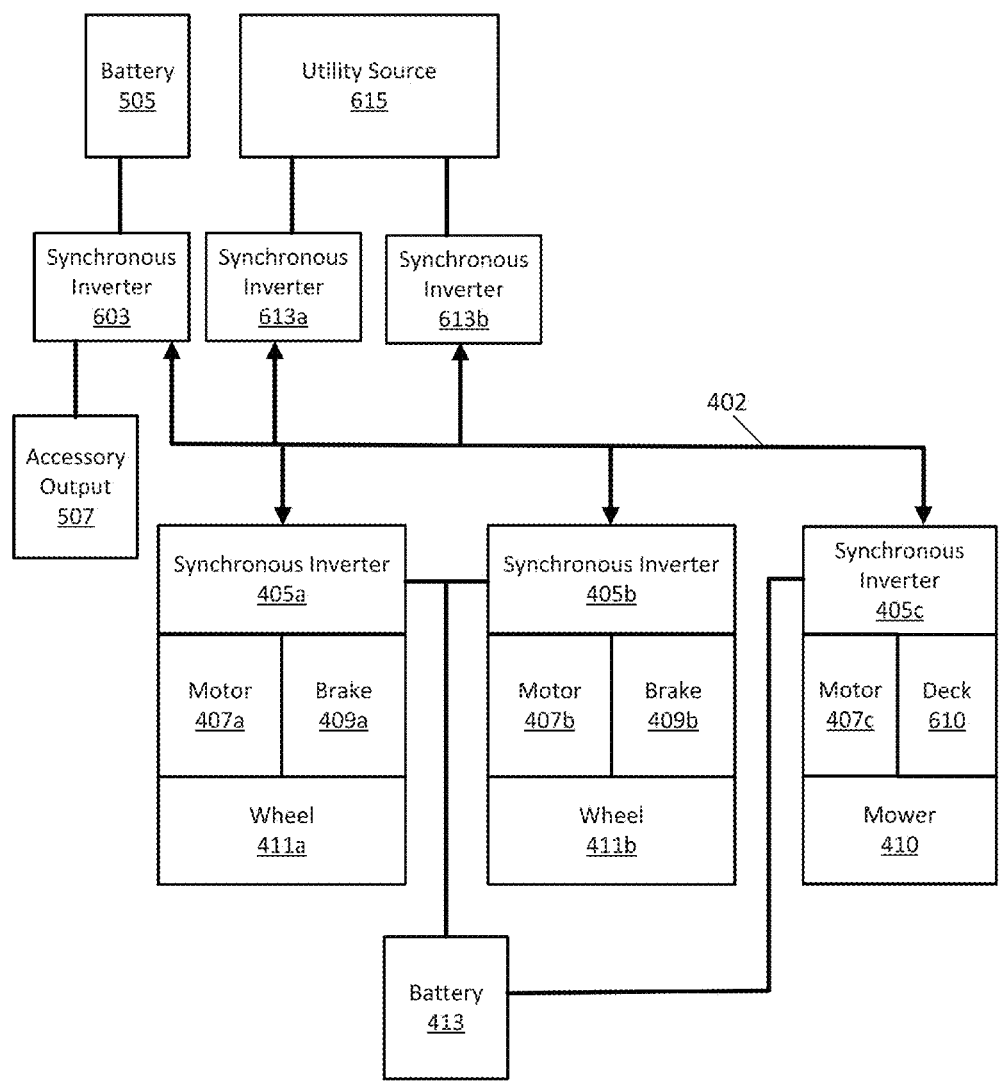
FIG. 24 illustrates an example lawnmower and a utility source.

FIG. 24 illustrates an example lawnmower and a utility source and no engine. Similar components illustrated previously are consistent with FIG. 24. Additional, different or fewer components may be included.

Depending on the circumstances or current settings, the utility source 615 and/or the battery 505 may provide power to the wheels 411*a* and 411*b* through synchronous inverters 405*a* and 405*b* and/or the mower 410 and/or deck 610 through the synchronous inverter 405*c*. Also depending on the circumstances or current settings, the utility source 615 may charge the battery 505 through the synchronous inverter 603.

The battery 505 may also provide power to an external device such as a light tower. For example, at some times the utility source 615 charges the battery 505 when the utility (e.g., induction coils) are nearby, and when the lawnmower is remote from the utility source 615, the battery 505 provides power to the external device.

Figure 25:
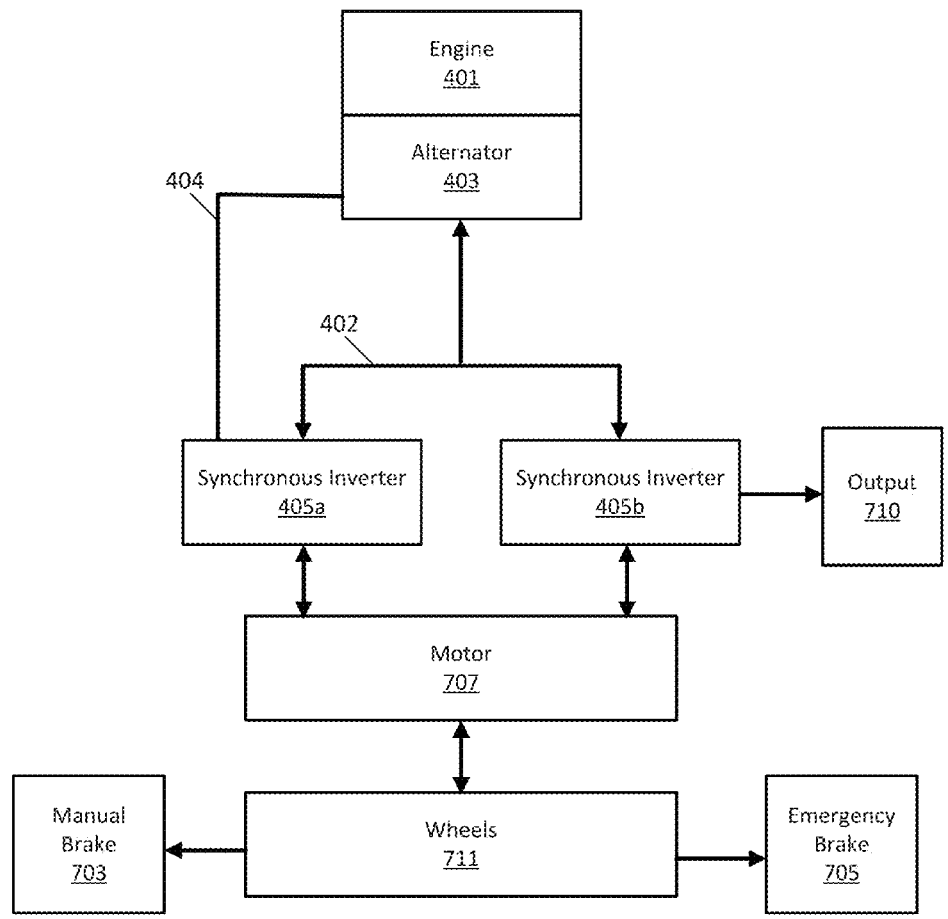
FIG. 25 illustrates an example vehicle including synchronous inverters.

FIG. 25 illustrates an example vehicle including synchronous inverters. Two synchronous inverters 405 are shown, but more or fewer can be used to power motor 707. In the case of more than one synchronous inverter 405, they would be operated in parallel to increase power capacity, increase voltage, increase redundancy, or for improved controllability. Similar components illustrated previously are consistent with FIG. 25. Additional, different or fewer components may be included. The embodiment of FIG. 25 may be a lawnmower but is not a zero turn radius lawnmower. The vehicle includes the engine 401, the alternator 403, one or more synchronous inverters 405*a* and 405*b*, a motor 707 coupled with wheels 711, a manual brake 703, an emergency brake 705, and an output 710. The wheels may be connected to the motor directly or via a torque converter (e.g. gear reduction, differential). A steering mechanism turns wheels 711 together. As described in earlier embodiments, power transfer may occur in a forward direction from the alternator 403, through the synchronous inverters 405, to the motor 707, and ultimately to wheels 711. An output of one of the synchronous inverters 405 may provide the output 710, which may be converted from DC to AC (e.g., 120 V convenience output).

Figure 26:
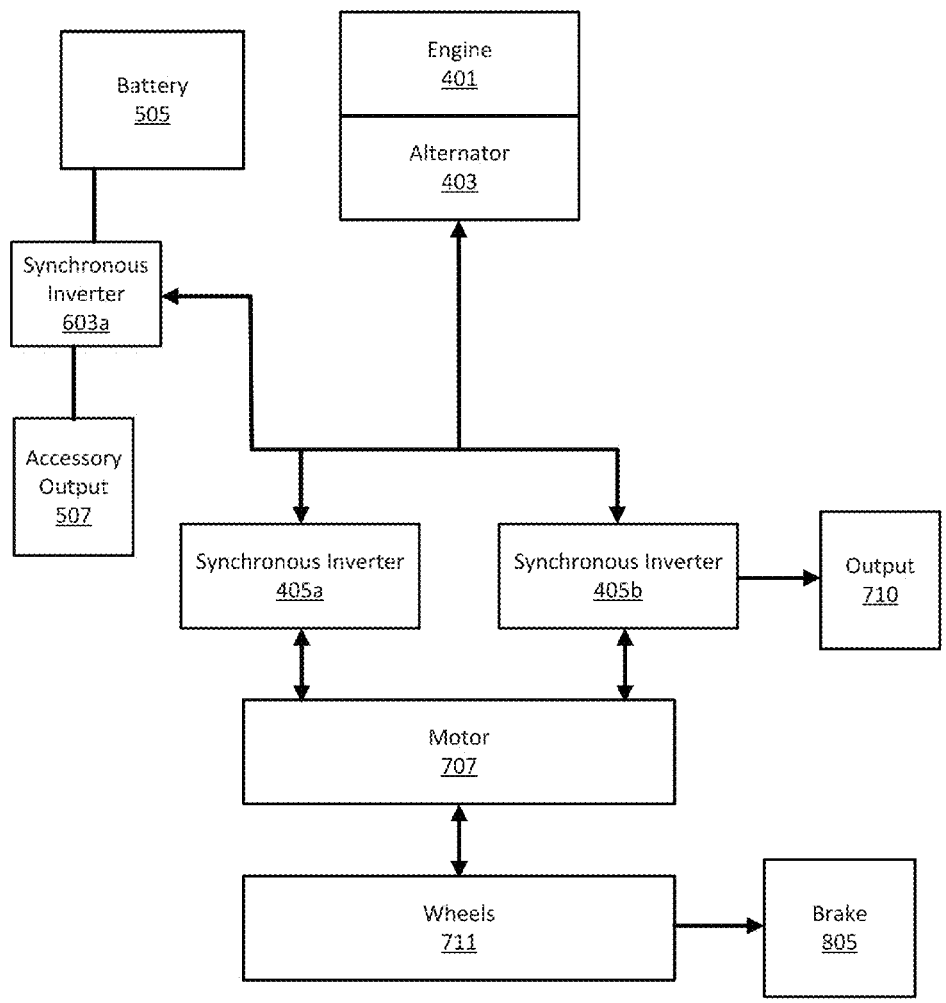
FIG. 26 illustrates an example vehicle including synchronous inverters in addition to a synchronous inverter for battery charging.

FIG. 26 illustrates an example vehicle including synchronous inverters in addition to a synchronous inverter for battery charging. Similar components illustrated previously are consistent with FIG. 26. Additional, different or fewer components may be included.

As described in earlier embodiments, bidirectional power transfer may occur in a forward direction from the alternator 403, through the synchronous inverters 405, to the motor 707, and in a reverse direction from the wheels 711 in response to either emergency brake 705 or manual brake 703 being applied, through the synchronous inverters 405 and 603a to the battery 505.

Rather than the manual brakes in the embodiment of FIG. 25, a brake 805 provides stopping capability in addition to the stopping capability provided in a regenerative control scheme. In the regenerative mode, the motor 707 supplies power through the synchronous inverter 405 to the alternator 403, the battery 505, either output 710 or 507, or any combination thereof.

Figure 27:
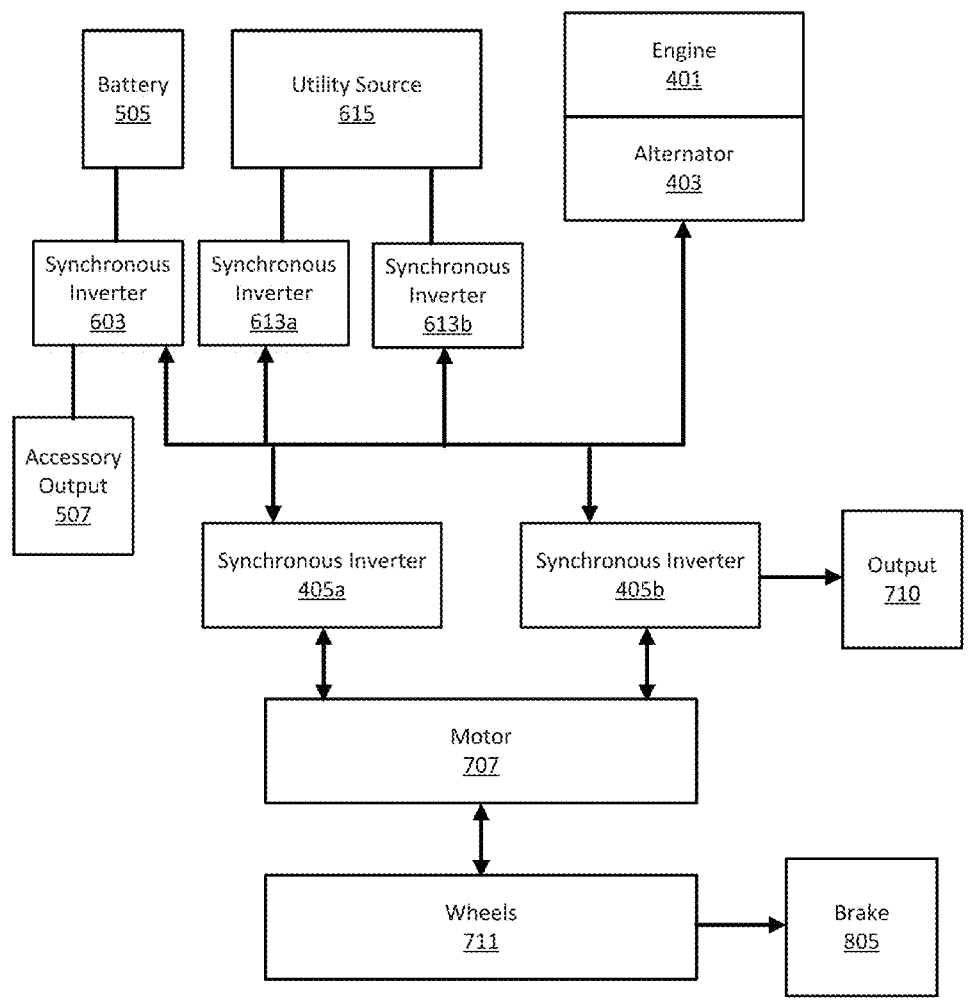
FIG. 27 illustrates an example vehicle including synchronous inverters and a utility source.

FIG. 27 illustrates an example vehicle including synchronous inverters and the utility source 615. Depending on the circumstances or current settings, the utility source 615, the battery 505 and/or the alternator 403 may provide power to the wheels 711 through synchronous inverters 405a and 405b. Also depending on the circumstances or current settings, the utility source 615 and/or the alternator 403 may charge the battery 505 through the synchronous inverter 603.

Figure 28:
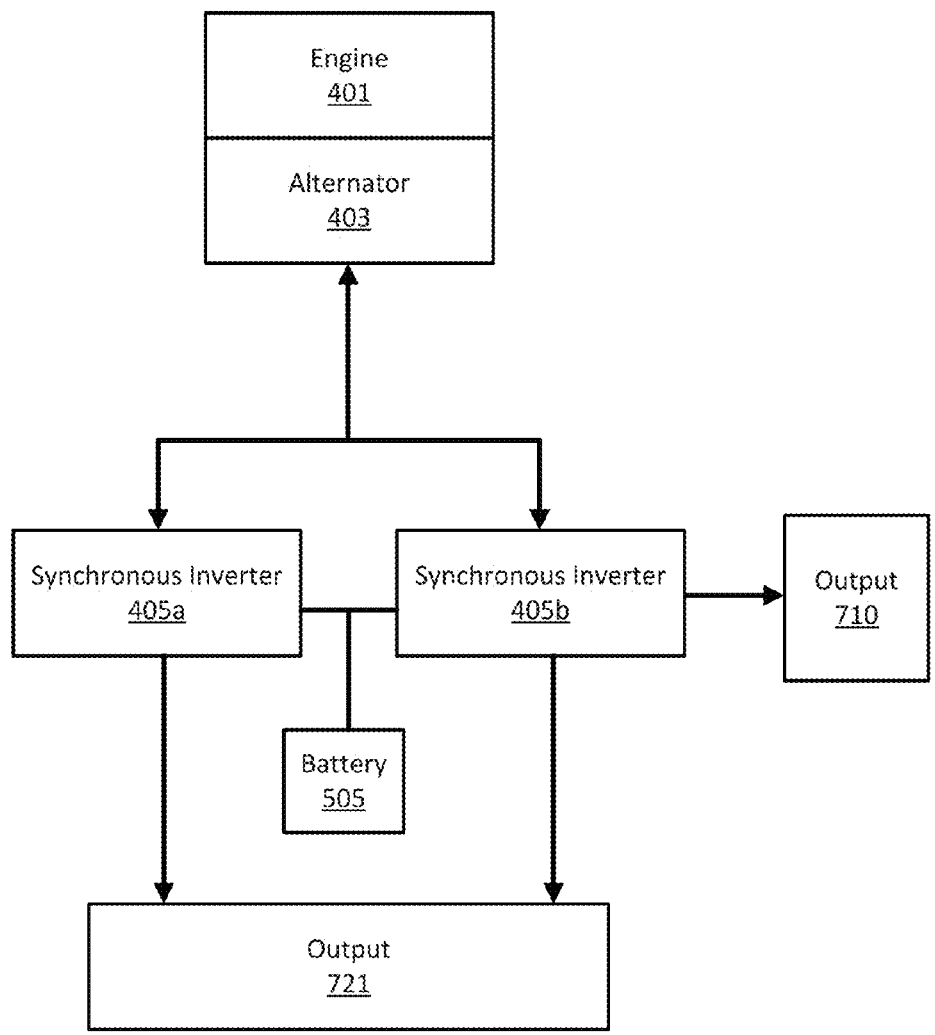
FIG. 28 illustrates an example generator system including a synchronous inverter system.

FIG. 28 illustrates an example generator system including a synchronous inverter system. Similar components illustrated previously are consistent with FIG. 28. Output 710 is a DC output and output 721 is an AC output. Through the synchronous inverters 405a and 405b, the engine 401 may run at variable speeds while providing a constant AC output 721.

Figure 29:
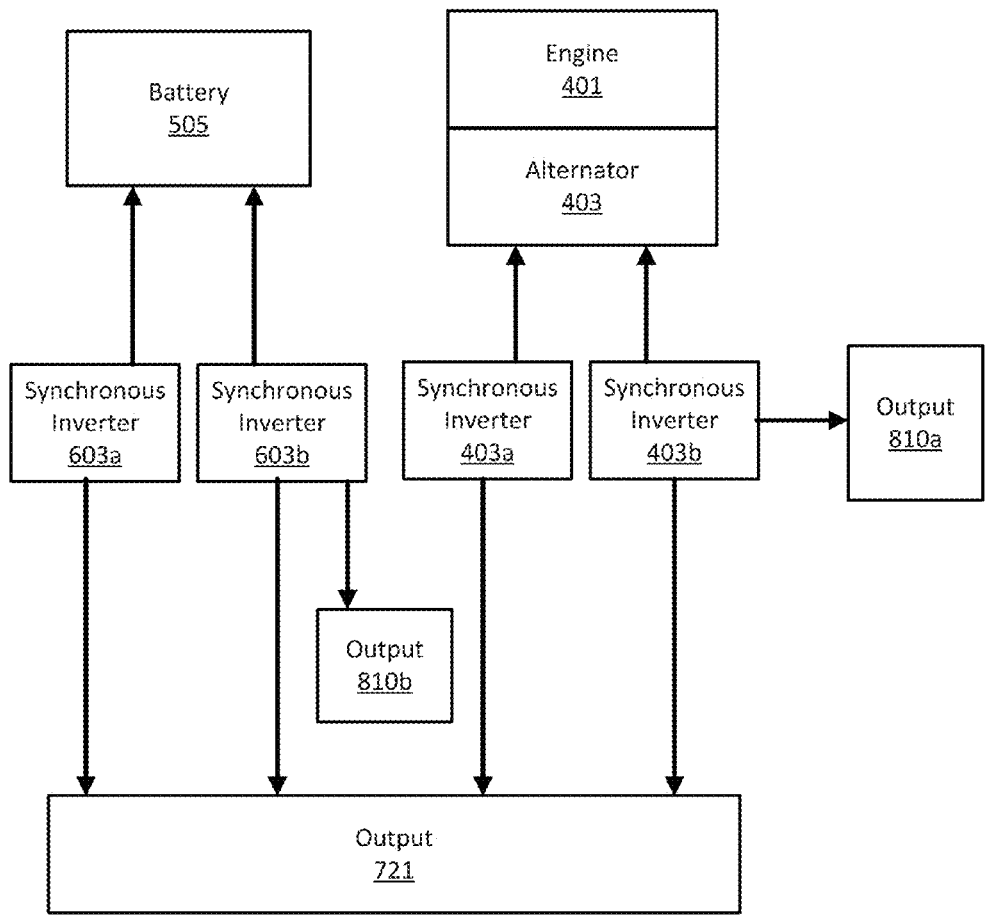
FIG. 29 illustrates an example generator system including a synchronous inverter system for providing power from the generator in addition to a synchronous inverter for providing power from a battery.

FIG. 29 illustrates an example generator system including a synchronous inverter system for providing power from the generator in addition to a synchronous inverter for providing power from a battery. Similar components illustrated previously are consistent with FIG. 29. Each synchronous inverter system may provide a DC output. Synchronous inverters 603a and 603b provide DC output 810b, and synchronous inverters 403a and 403b provide DC Output 810a.

Figure 30:
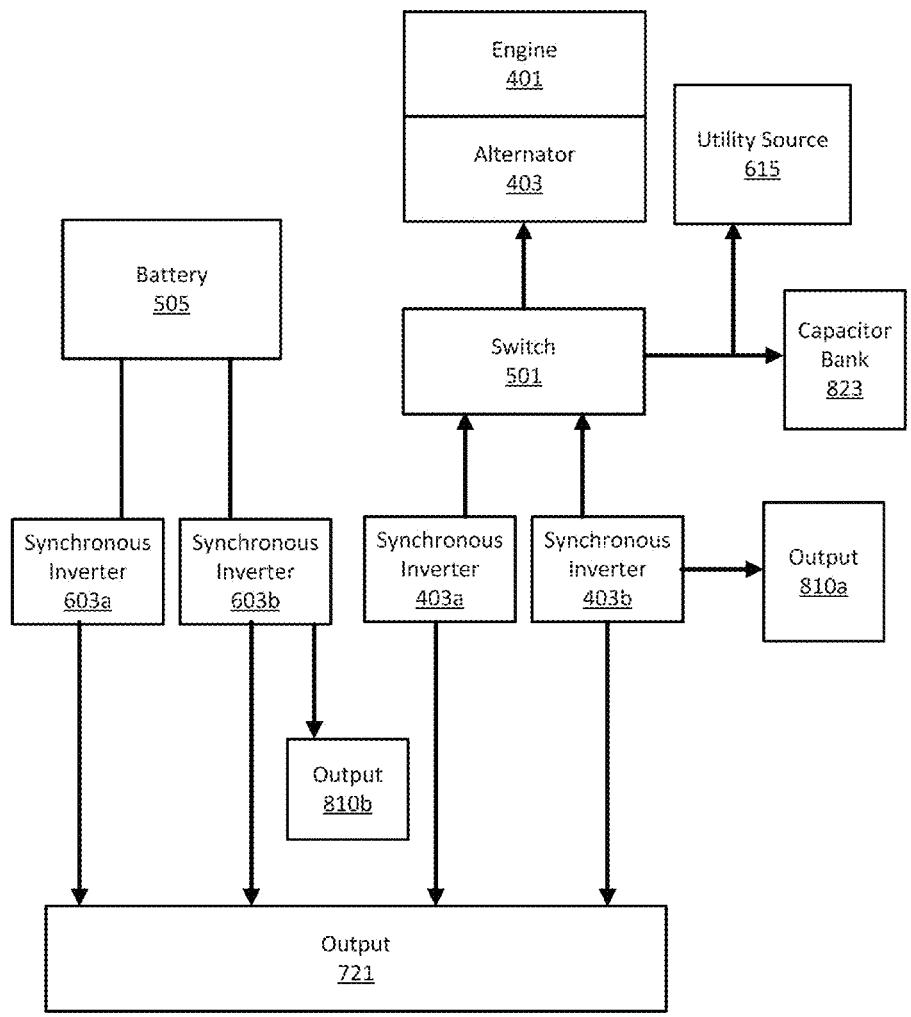
FIG. 30 illustrates another example generator system with a synchronous inverter.

FIG. 30 illustrates another example generator system with synchronous inverter. Similar components illustrated previously are consistent with FIG. 30.

The capacitor bank 823 may adapt the single phase utility from utility source 615 for the synchronous inverters. The capacitor bank 823 generates a poly-phase signal from the single phase utility through phase shifting the single phase source. The difference in phase is utilized to provide poly-phase input to the synchronous inverter 403. The capacitor bank 823 may include two or more capacitors, or two or more sets of capacitors to convert single phase source to a three phase signal. The single phase utility source may be designated as phase A, the output of a first capacitor or first set of capacitors may be designated as phase B, and the outputs of a second capacitor or second set of capacitors may be designated as phase C.

Figure 31:
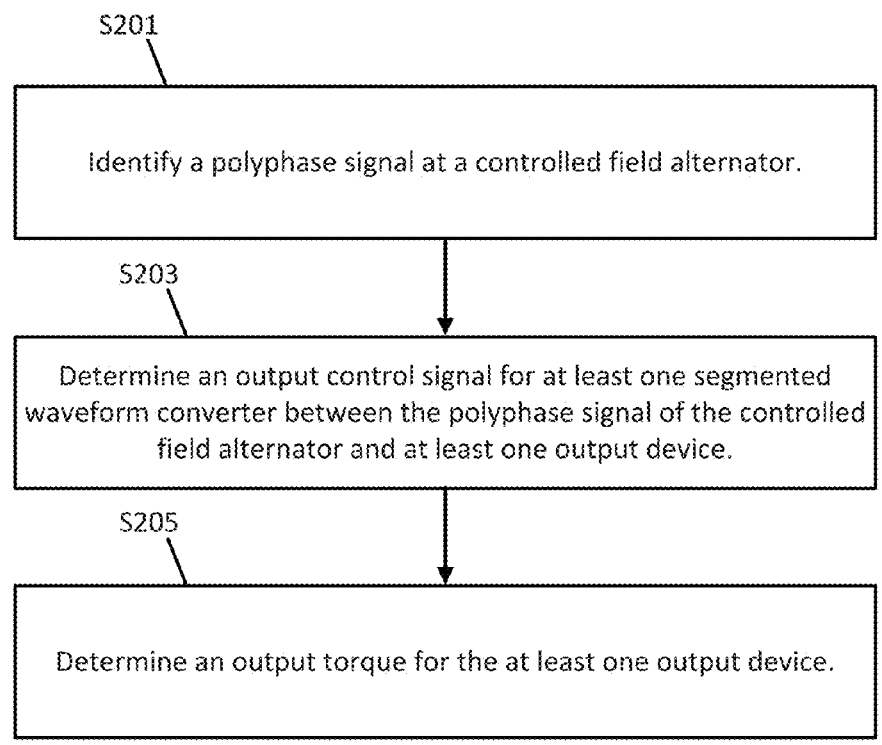
FIG. 31 illustrates a flow chart for the operation of the generator controller of FIG. 16.

FIG. 31 illustrates a flow chart for the operation of the generator controller of FIG. 16. Additional, different of fewer acts may be included.

At act S201, the processor 300 identifies a polyphase signal at a controlled field alternator (e.g., alternator 403). The polyphase signal may be detected by the sensing circuit 311.

At act S203, the processor 300 determines determining an output control signal for at least one synchronous inverter to control switches connected between the polyphase signal of the controlled field alternator and at least one output device. The output control signal determines the output of the at least one synchronous inverter.

At act S205, the processor 300 determines an output torque for the at least one output device. The output device may be a wheel, a drive mechanism, a mowing system, a deck height system, or a generator. In an alternative embodiment, the processor 300 may determine an output speed, position, or other target for the at least one output device. Additionally, the controlled field alternator may be utilized as the electrical power source or electrical power may be supplied by an alternative source (e.g. utility, battery, wind, solar, nuclear).

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 353 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352 or database 357) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

We claim:

1. An apparatus comprising:
an alternator;
an output drive mechanism; and
at least one synchronous inverter including a plurality of switches connected between the alternator and the output drive mechanism,
wherein the at least one synchronous inverter includes a first synchronous inverter associated with a first wheel of a vehicle and a second synchronous inverter associated with a second wheel of the vehicle, wherein the first wheel or the second wheel is coupled to the output drive mechanism,
wherein a force from the first wheel causes power to flow from the first synchronous inverter to the second synchronous inverter to the second wheel.

2. The apparatus of claim 1, wherein the alternator is of a dual axis type including airgaps that are co-axially located on a common plane normal to an axis of rotation of the alternator.

3. The apparatus of claim 1, wherein the output drive mechanism is coupled with a mowing system.

4. The apparatus of claim 1, further comprising:
a battery, wherein the at least one synchronous inverter includes a supplemental synchronous inverter configured to charge the battery.

5. The apparatus of claim 4, wherein the at least one synchronous inverter includes a synchronous inverter associated with a first wheel of a vehicle and a synchronous inverter associated with a second wheel of the vehicle, wherein the first wheel or the second wheel is coupled to the output drive mechanism.

6. The apparatus of claim 4, wherein power associated with braking the first wheel is transferred to the battery through the supplemental synchronous inverter for charging the battery.

7. The apparatus of claim 1, further comprising:
a direct current output of the at least one synchronous inverter configured to provide a field current to the alternator.

8. The apparatus of claim 1, further comprising:
a utility bus configured to receive power from a utility for the at least one synchronous inverter.

9. The apparatus of claim 8, wherein the utility bus includes an inductive coil for wirelessly receiving power from the utility.

10. The apparatus of claim 1, further comprising:
a controller configured to provide a control signal for the plurality of switches based on measured electrical quantities associated with an output and provide a field control signal to the alternator.

11. The apparatus of claim 10, wherein the controller is configured to calculate a plurality of combinations of available voltages through different settings for the plurality of switches, a connection configuration of the outputs, or the field control signal.

12. An apparatus comprising:
an alternator;
a first output drive mechanism;
a first synchronous inverter associated with a first wheel of a vehicle and including a first plurality of switches connected between the alternator and the first output drive mechanism;
a second output drive mechanism; and
a second synchronous inverter associated with a second wheel of a vehicle and including a second plurality of switches connected between the alternator and the second output drive mechanism,
wherein a force from the first wheel causes power to flow from the first synchronous inverter to the second synchronous inverter to the second wheel.

13. The apparatus of claim 12, wherein the alternator is of a dual axis type including airgaps that are co-axially located on a common plane normal to an axis of rotation of the alternator.

14. The apparatus of claim 12, wherein the first output drive mechanism is coupled with a mowing system.

15. The apparatus of claim 12, further comprising:
a battery; and
a supplemental synchronous inverter configured to charge the battery.

16. The apparatus of claim 12, further comprising:
a direct current output of the first synchronous inverter configured to provide a field current to the alternator.

* * * * *